US012598311B2

(12) United States Patent
Lee

(10) Patent No.: US 12,598,311 B2
(45) Date of Patent: *Apr. 7, 2026

(54) METHOD FOR PROCESSING IMAGE ON BASIS OF INTER-PREDICTION MODE AND APPARATUS THEREFOR

(71) Applicant: Nokia Technologies Oy, Espoo (FI)

(72) Inventor: Jaeho Lee, Seoul (KR)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/775,284

(22) Filed: Jul. 17, 2024

(65) Prior Publication Data

US 2024/0373037 A1 Nov. 7, 2024

Related U.S. Application Data

(63) Continuation of application No. 18/107,782, filed on Feb. 9, 2023, now Pat. No. 12,058,344, which is a continuation of application No. 17/093,268, filed on Nov. 9, 2020, now Pat. No. 11,606,566, which is a continuation of application No. PCT/KR2019/005668, filed on May 10, 2019.

(30) Foreign Application Priority Data

May 10, 2018 (KR) ........................ 10-2018-0053665

(51) Int. Cl.
*H04N 19/52* (2014.01)
*H04N 19/105* (2014.01)
*H04N 19/159* (2014.01)
*H04N 19/176* (2014.01)
*H04N 19/70* (2014.01)

(52) U.S. Cl.
CPC ......... *H04N 19/159* (2014.11); *H04N 19/105* (2014.11); *H04N 19/176* (2014.11); *H04N 19/52* (2014.11); *H04N 19/70* (2014.11)

(58) Field of Classification Search
CPC .. H04N 19/159; H04N 19/105; H04N 19/176; H04N 19/52; H04N 19/70
USPC ...................................................... 375/240.16
See application file for complete search history.

(56) References Cited

U.S. PATENT DOCUMENTS

| | | | | |
|---|---|---|---|---|
| 2019/0110064 A1* | 4/2019 | Zhang | ..................... | H04N 19/54 |
| 2021/0120262 A1* | 4/2021 | Chen | ..................... | H04N 19/513 |
| 2021/0195227 A1* | 6/2021 | Lee | ..................... | H04N 19/55 |
| 2021/0409723 A1* | 12/2021 | Lee | ..................... | H04N 19/567 |
| 2022/0078474 A1* | 3/2022 | Tamse | ..................... | H04N 19/40 |

* cited by examiner

*Primary Examiner* — Albert Kir
(74) *Attorney, Agent, or Firm* — McCarter & English LLP

(57) ABSTRACT

Disclosed are a method for decoding a video signal and an apparatus therefor. Specifically, a method for decoding an image based on an inter-prediction mode may include: configuring a merge candidate list by using motion information of a spatial candidate and a temporal candidate adjacent to a current block; parsing a first syntax element indicating a particular candidate applied to inter-prediction of the current block among a predefined number of candidates in the merge candidate list; deriving a refined candidate by adding a motion vector offset to a motion vector of a candidate indicated by the first syntax element; and generating a prediction block of the current block by using the motion information of the refined candidate.

3 Claims, 25 Drawing Sheets

[FIG. 1]
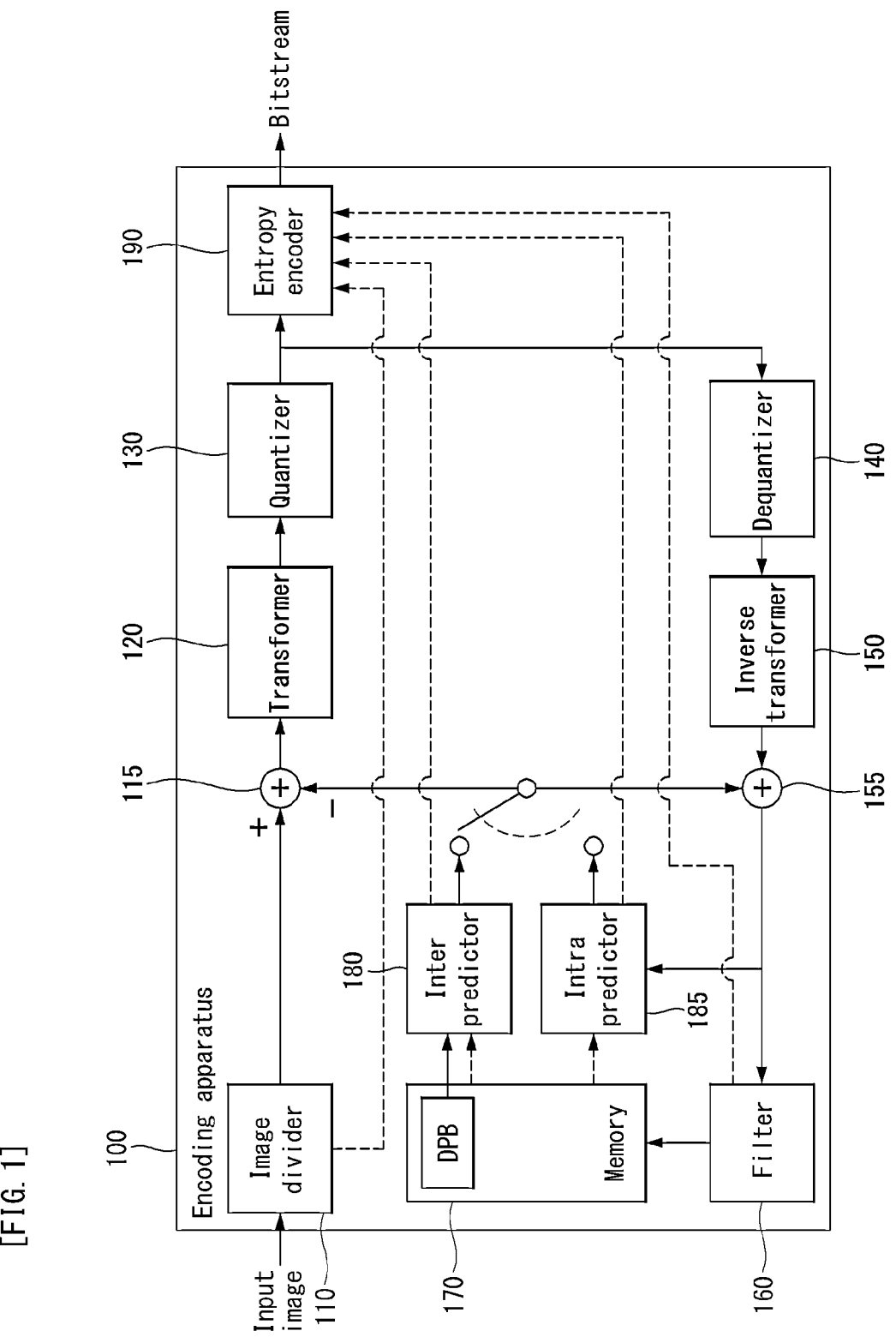

[FIG. 2]
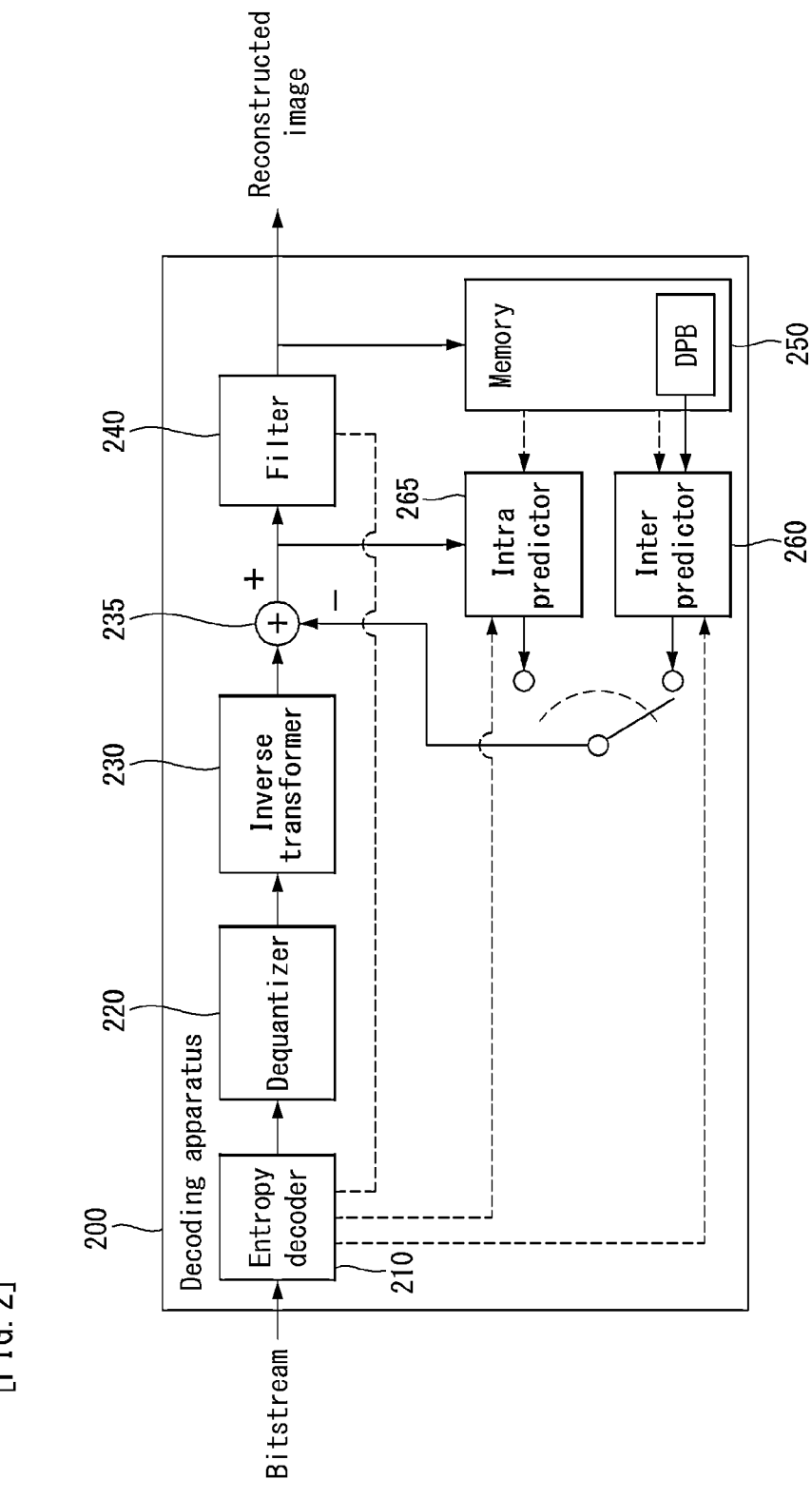

[FIG. 3]
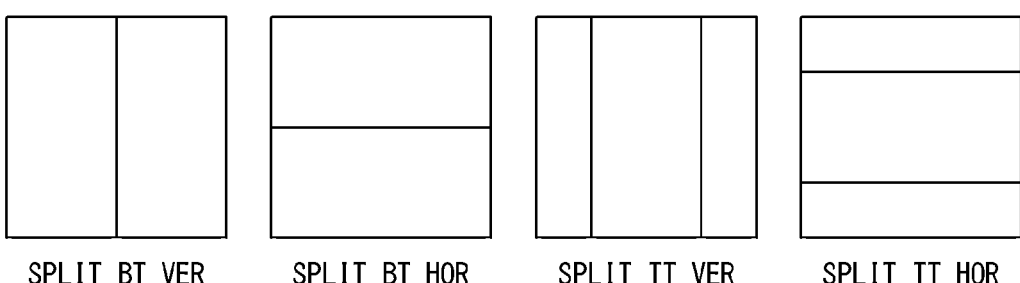
SPLIT_BT_VER          SPLIT_BT_HOR          SPLIT_TT_VER          SPLIT_TT_HOR

[FIG. 4]
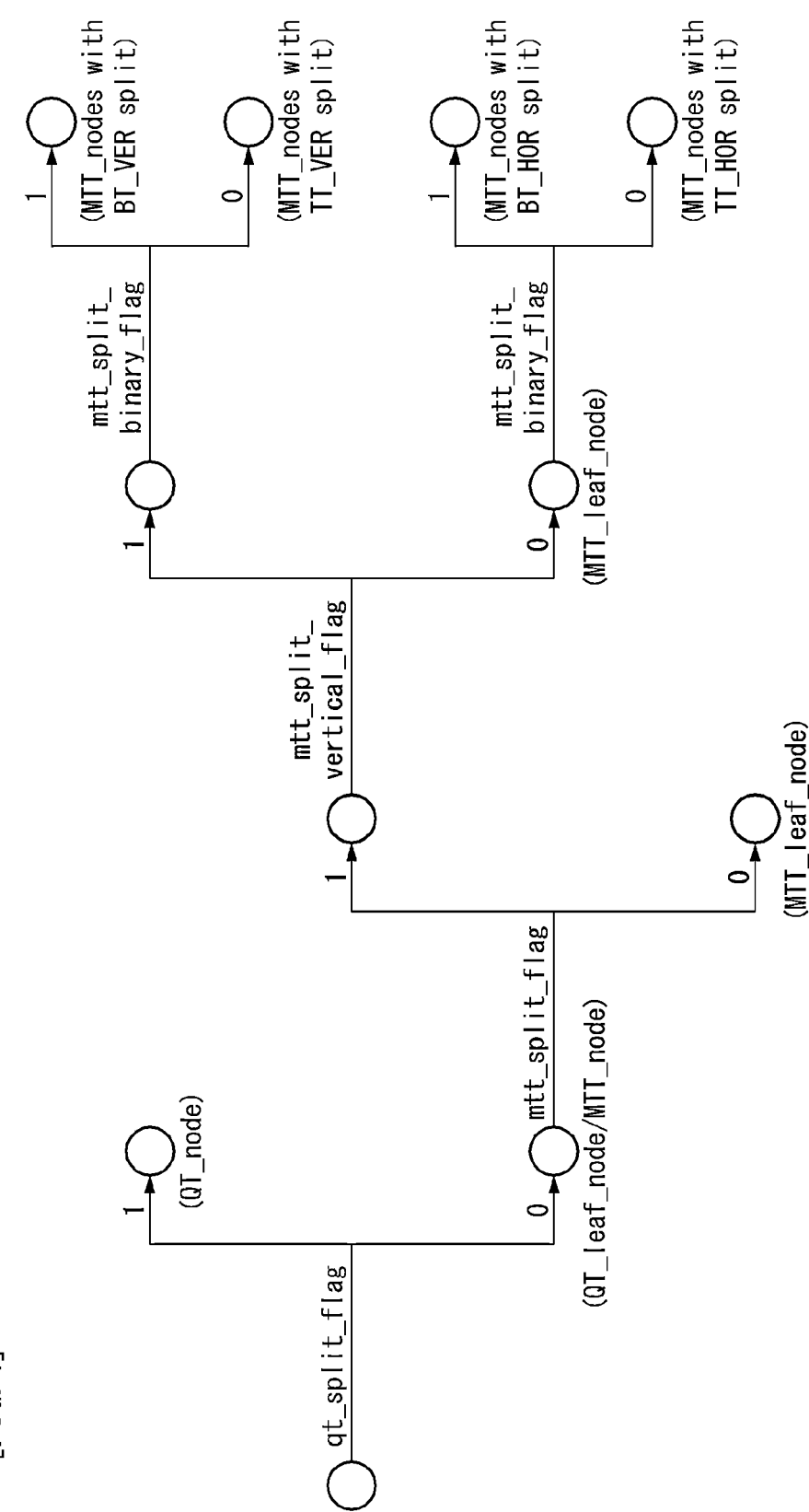

[FIG. 5]
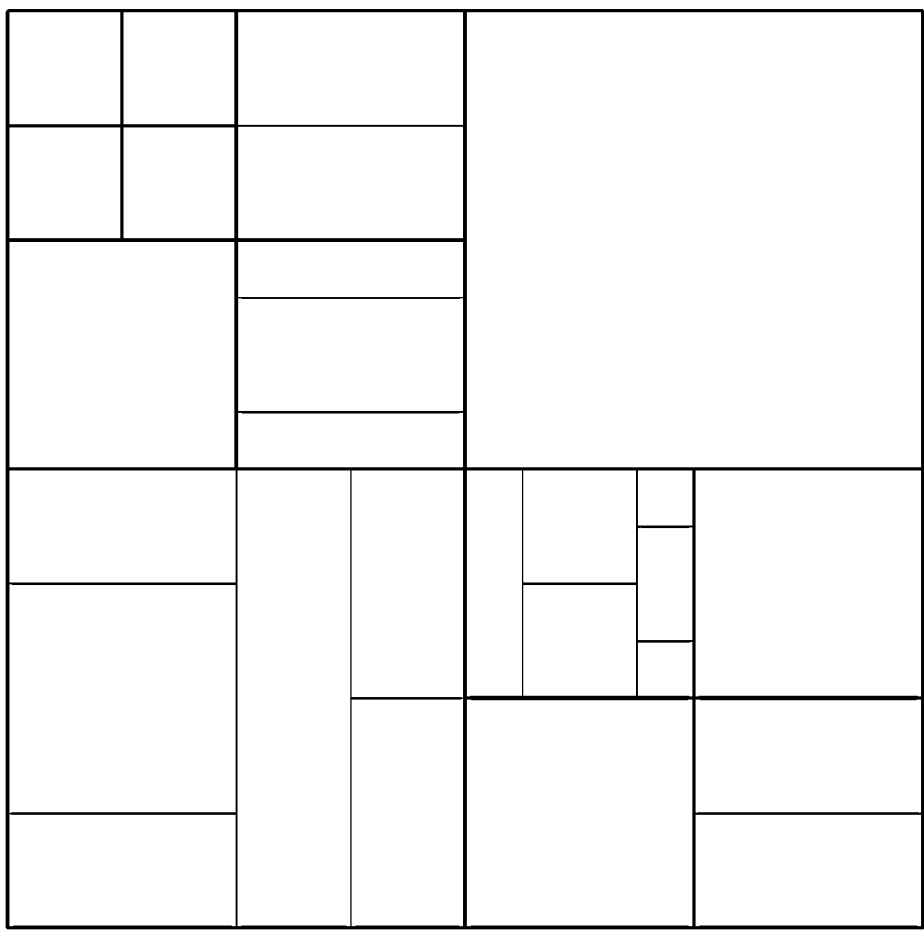

[FIG. 6]
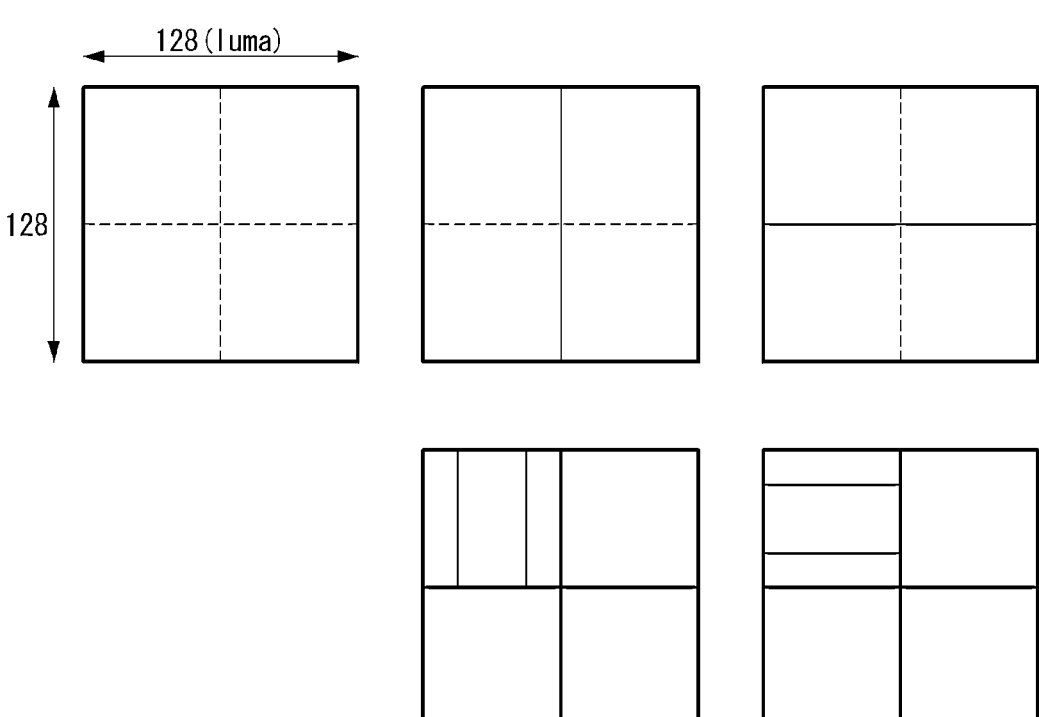

[FIG. 7]
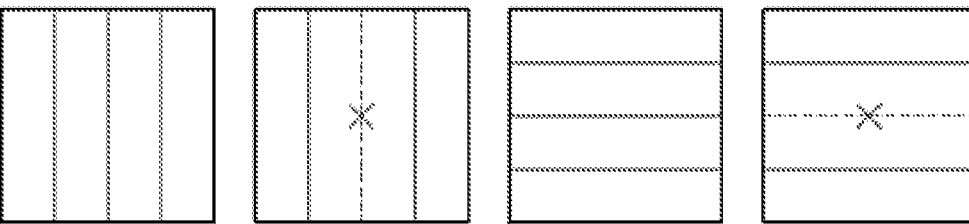

[FIG. 8]
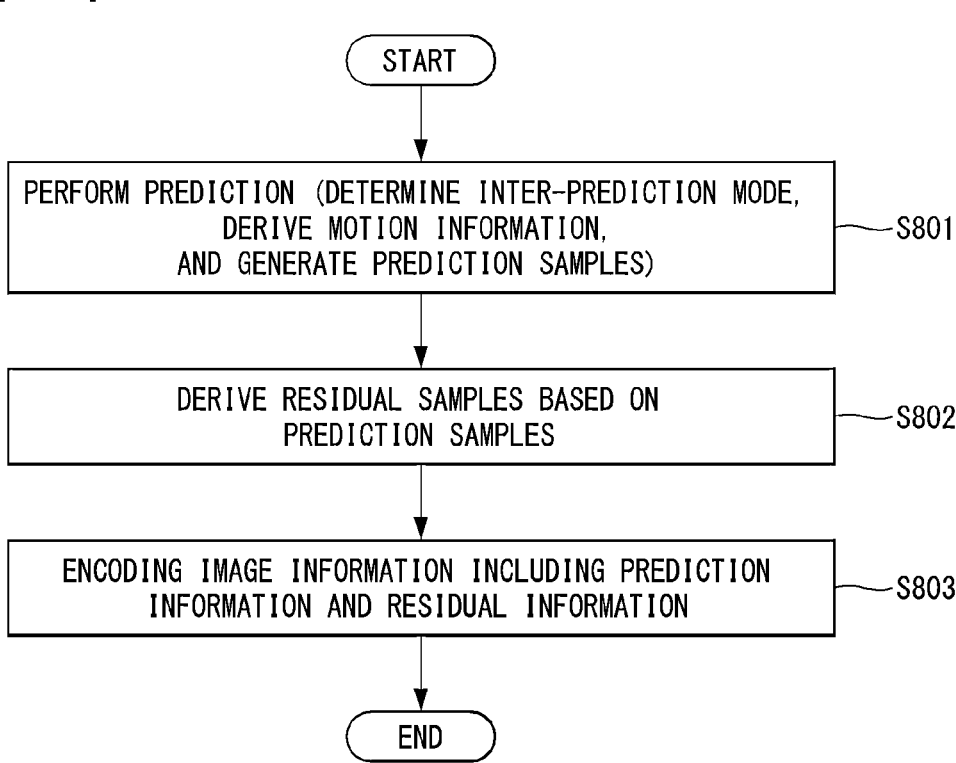

[FIG. 9]
180
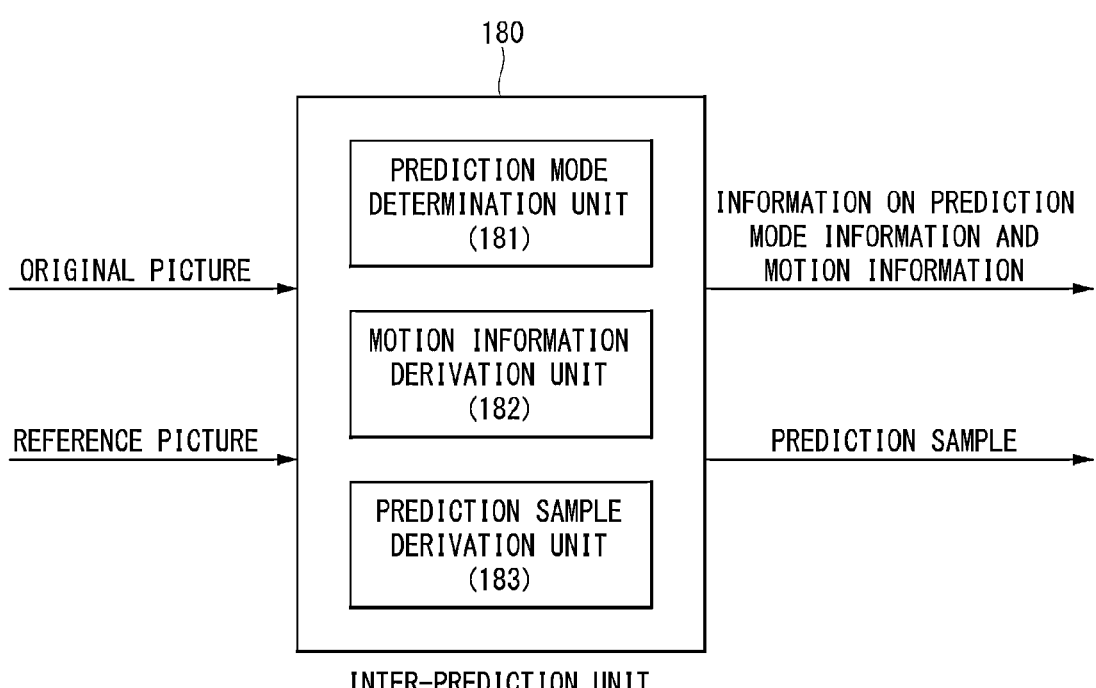
ORIGINAL PICTURE
REFERENCE PICTURE
PREDICTION MODE
DETERMINATION UNIT
(181)
MOTION INFORMATION
DERIVATION UNIT
(182)
PREDICTION SAMPLE
DERIVATION UNIT
(183)
INTER-PREDICTION UNIT
INFORMATION ON PREDICTION
MODE INFORMATION AND
MOTION INFORMATION
PREDICTION SAMPLE

[FIG. 10]
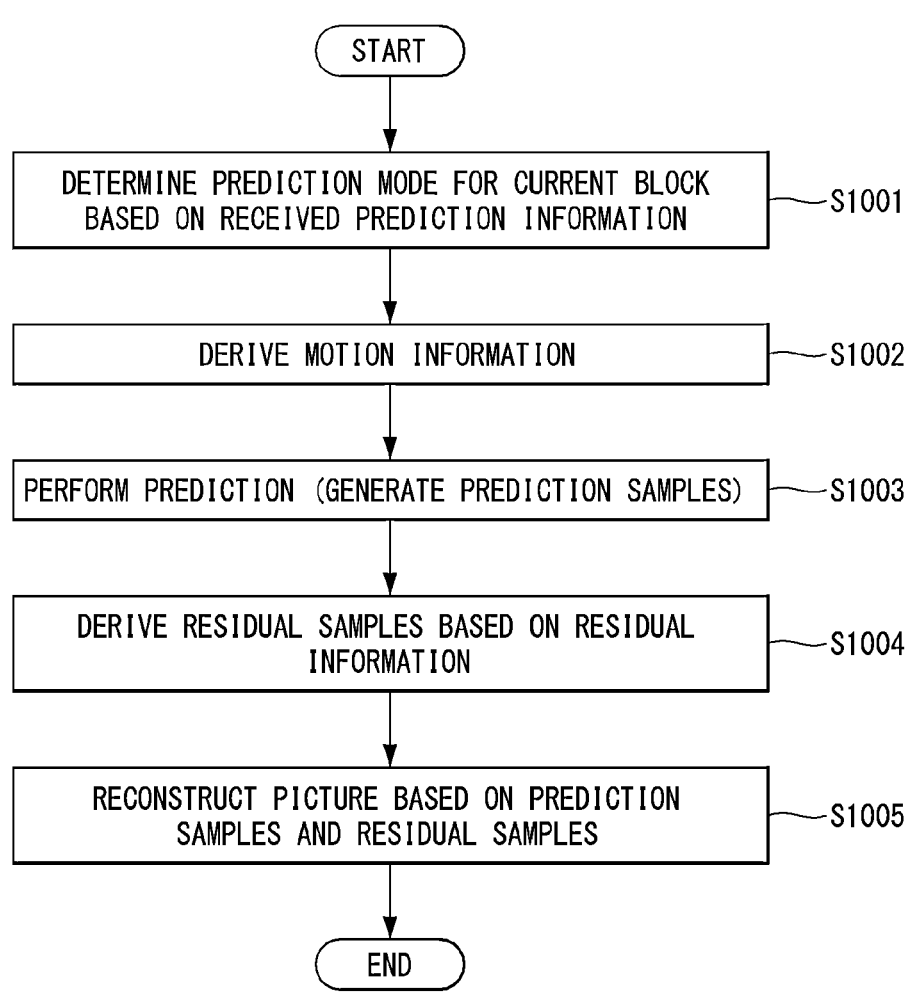

[FIG. 11]
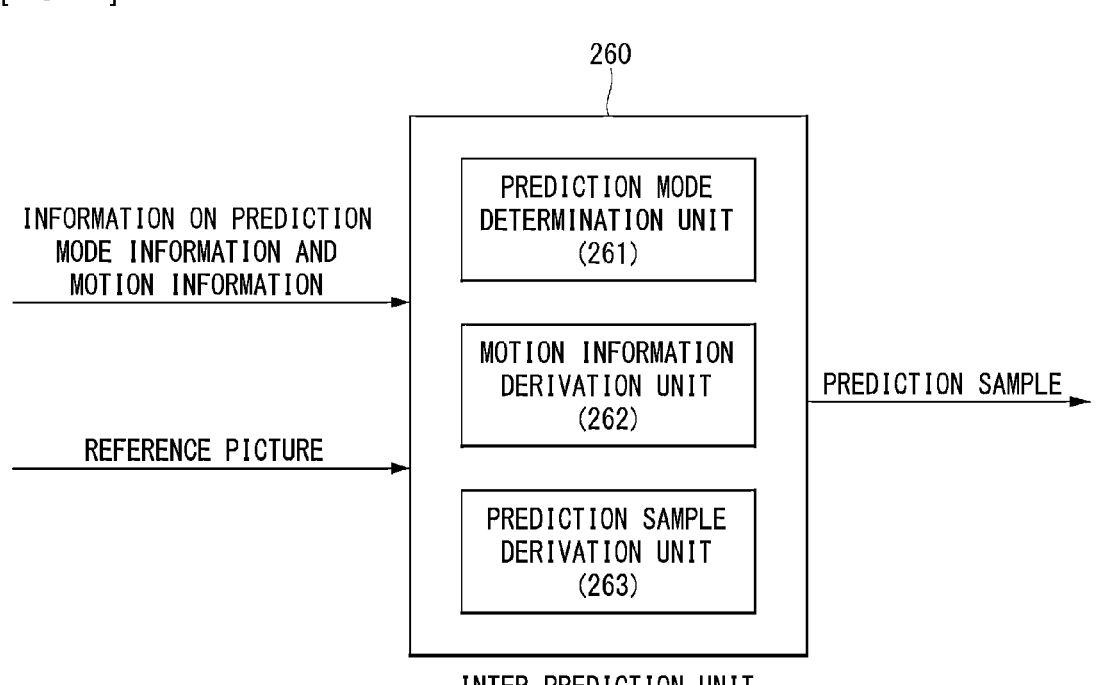
INTER-PREDICTION UNIT

[FIG. 12]
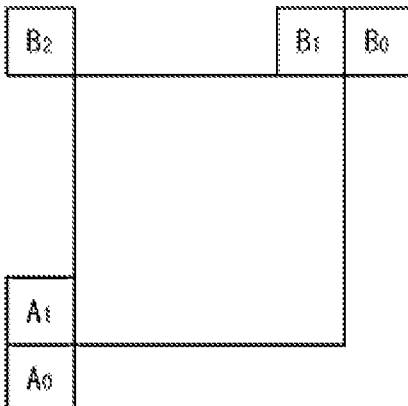

[FIG. 13]
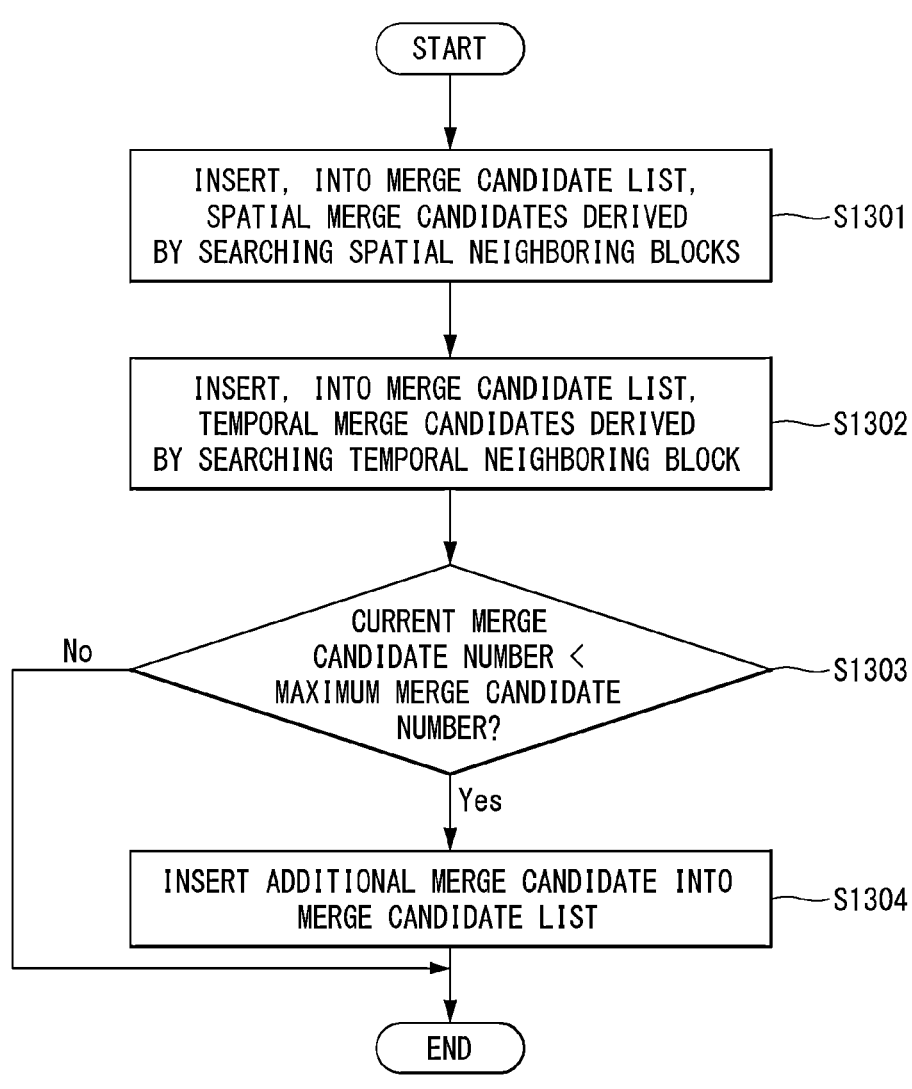

[FIG. 14]
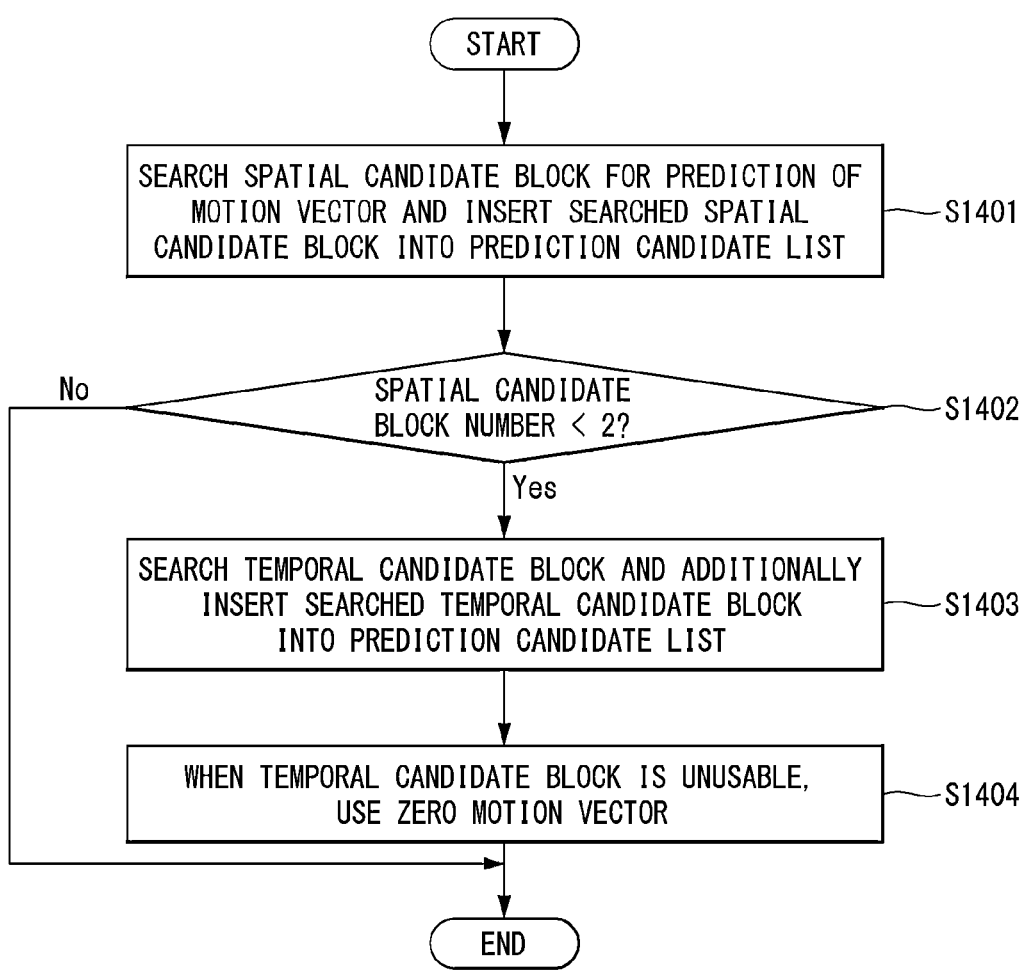

[FIG. 15]
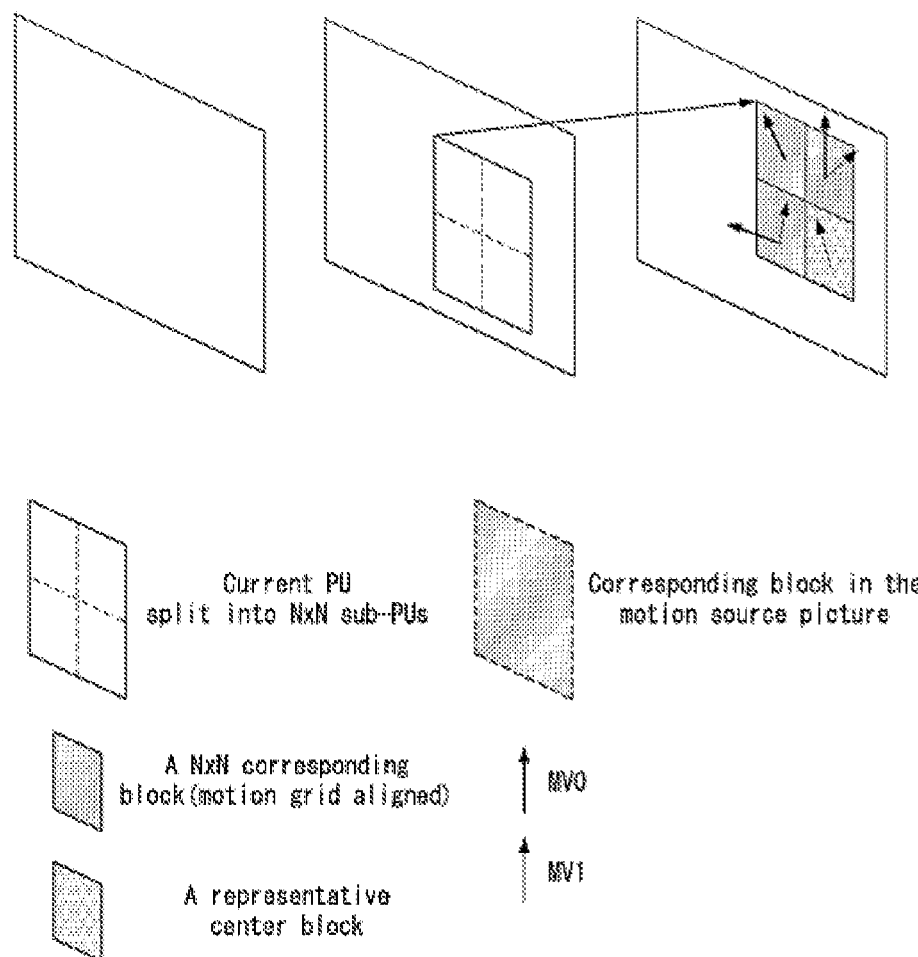

[FIG. 16]
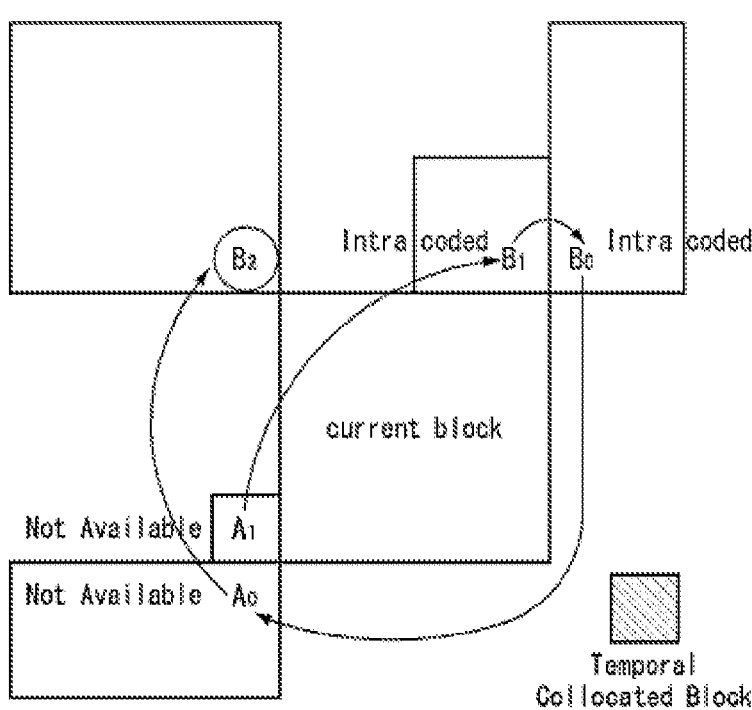

[FIG. 17]
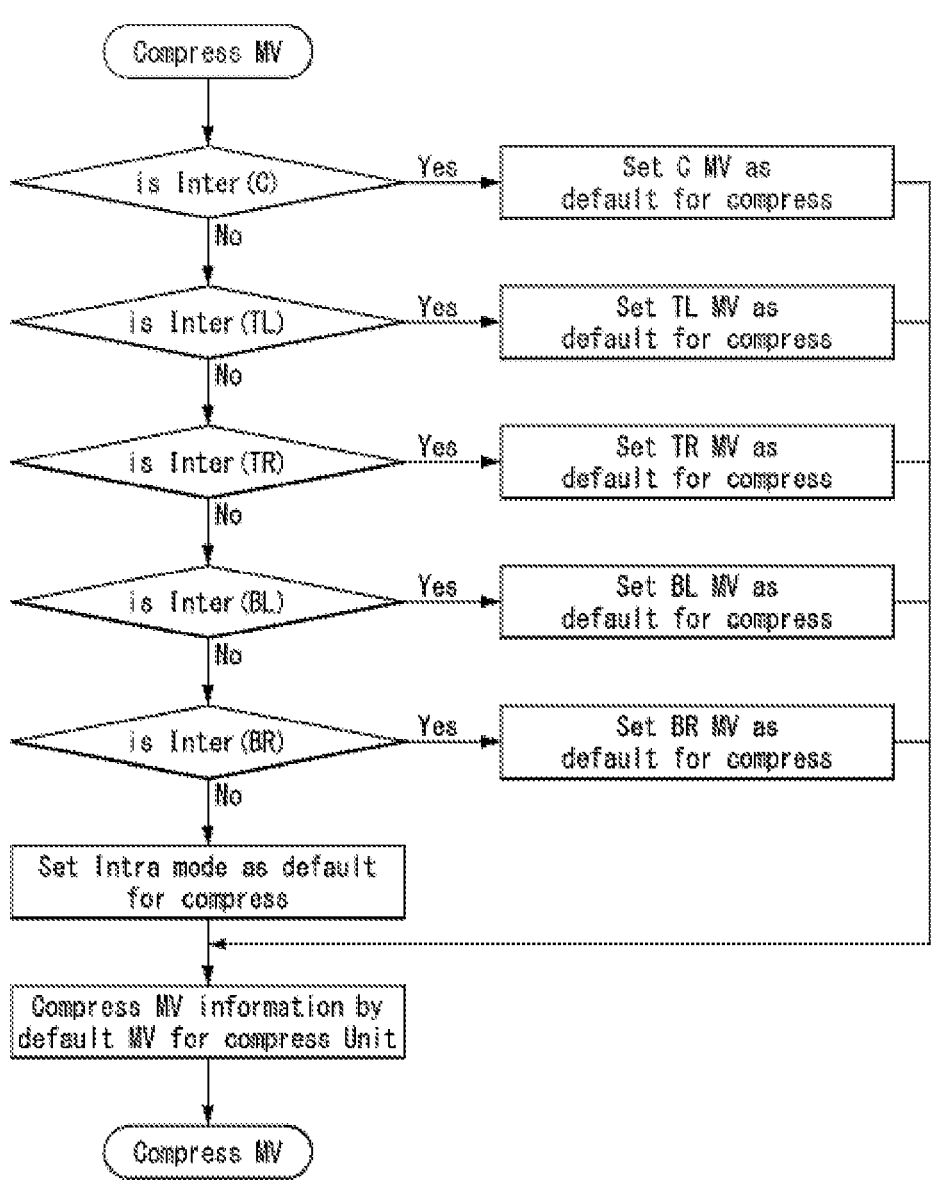

[FIG. 18]
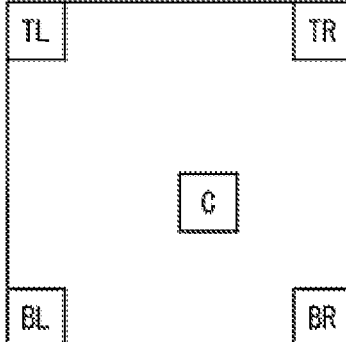

[FIG. 19]
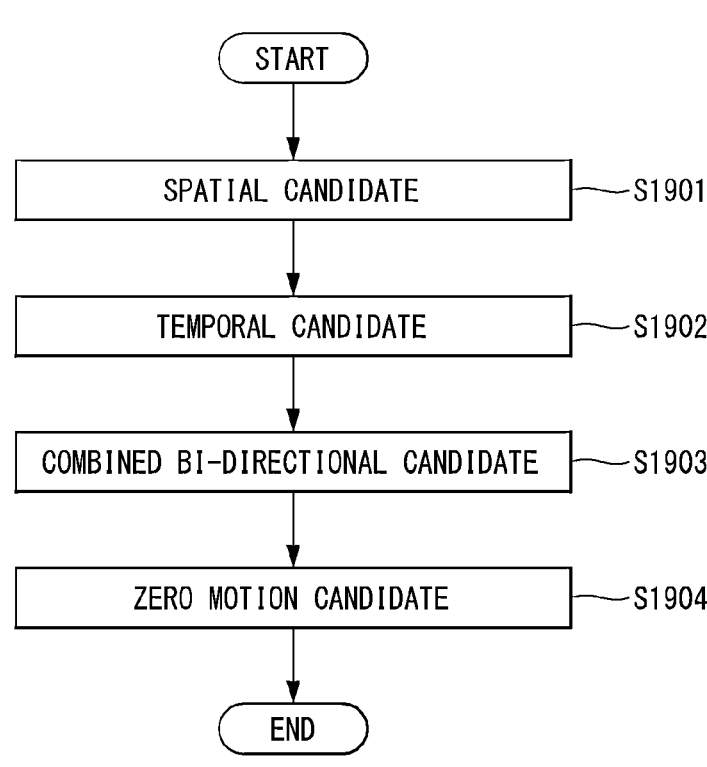

[FIG. 20]

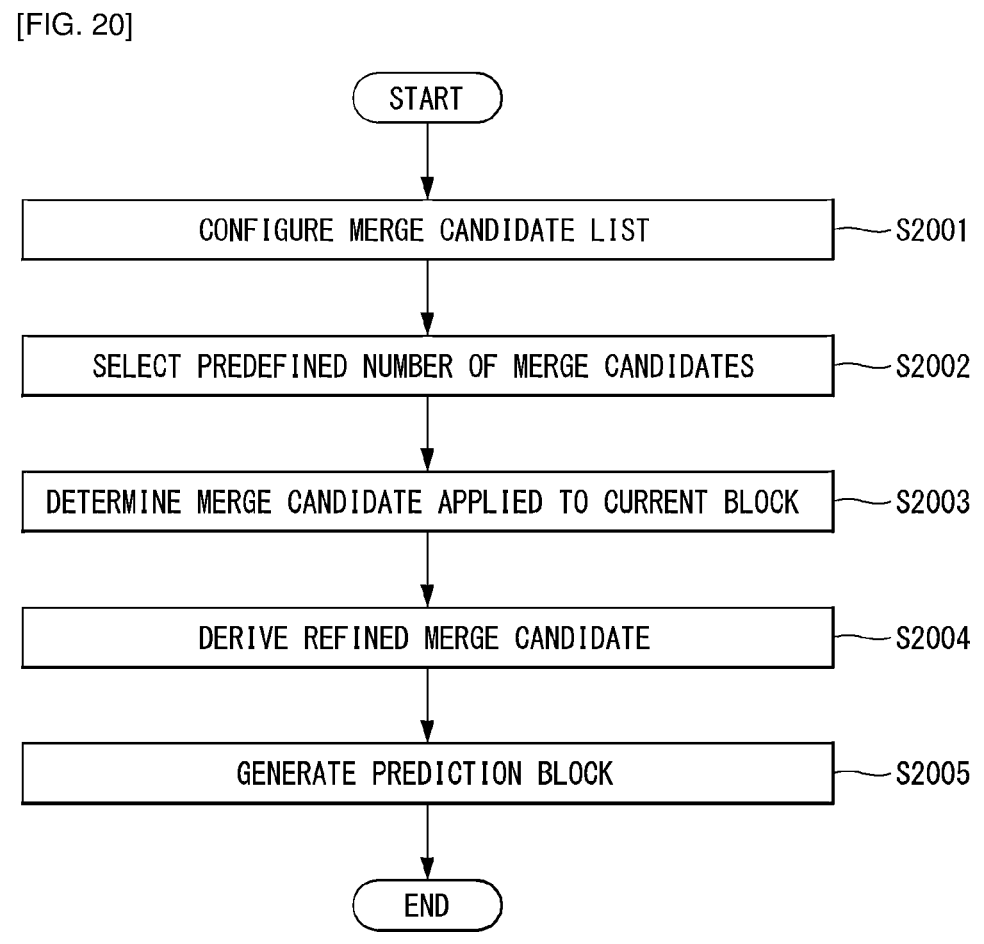

```
                          ╭──────────╮
                          │  START   │
                          ╰──────────╯
                                │
                                ▼
        ┌──────────────────────────────────────────────┐
        │       CONFIGURE MERGE CANDIDATE LIST          │──── S2001
        └──────────────────────────────────────────────┘
                                │
                                ▼
        ┌──────────────────────────────────────────────┐
        │   SELECT PREDEFINED NUMBER OF MERGE CANDIDATES │──── S2002
        └──────────────────────────────────────────────┘
                                │
                                ▼
        ┌──────────────────────────────────────────────┐
        │  DETERMINE MERGE CANDIDATE APPLIED TO CURRENT BLOCK │──── S2003
        └──────────────────────────────────────────────┘
                                │
                                ▼
        ┌──────────────────────────────────────────────┐
        │         DERIVE REFINED MERGE CANDIDATE         │──── S2004
        └──────────────────────────────────────────────┘
                                │
                                ▼
        ┌──────────────────────────────────────────────┐
        │            GENERATE PREDICTION BLOCK           │──── S2005
        └──────────────────────────────────────────────┘
                                │
                                ▼
                          ╭──────────╮
                          │   END    │
                          ╰──────────╯
```

[FIG. 21]
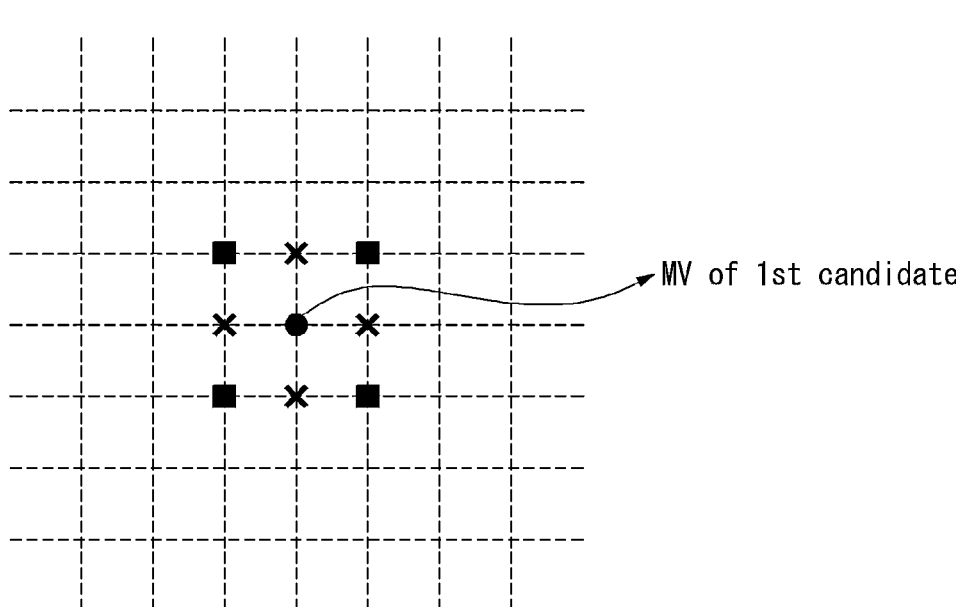
MV of 1st candidate

[FIG. 22]
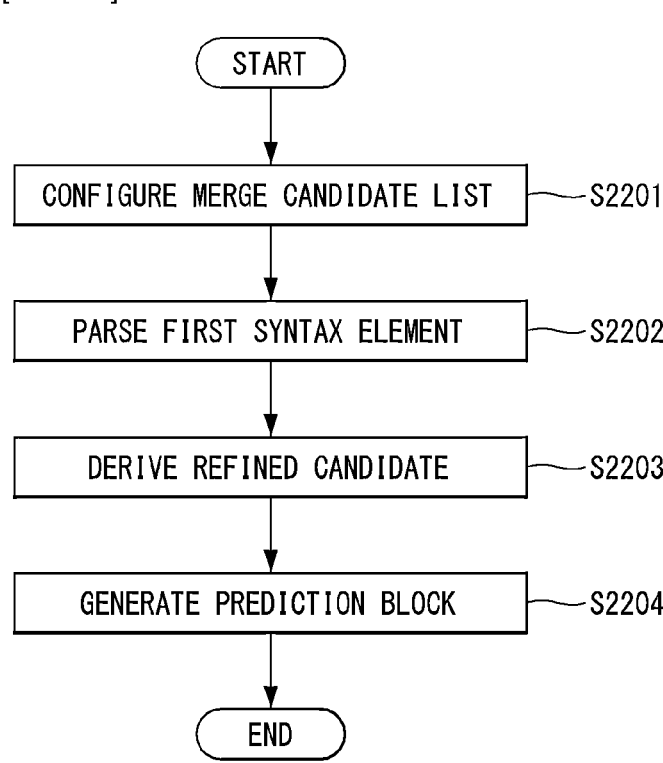

[FIG. 23]
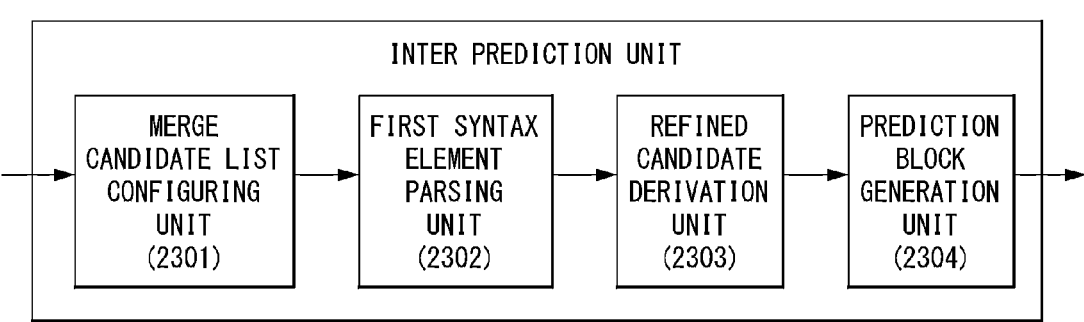

[FIG. 24]
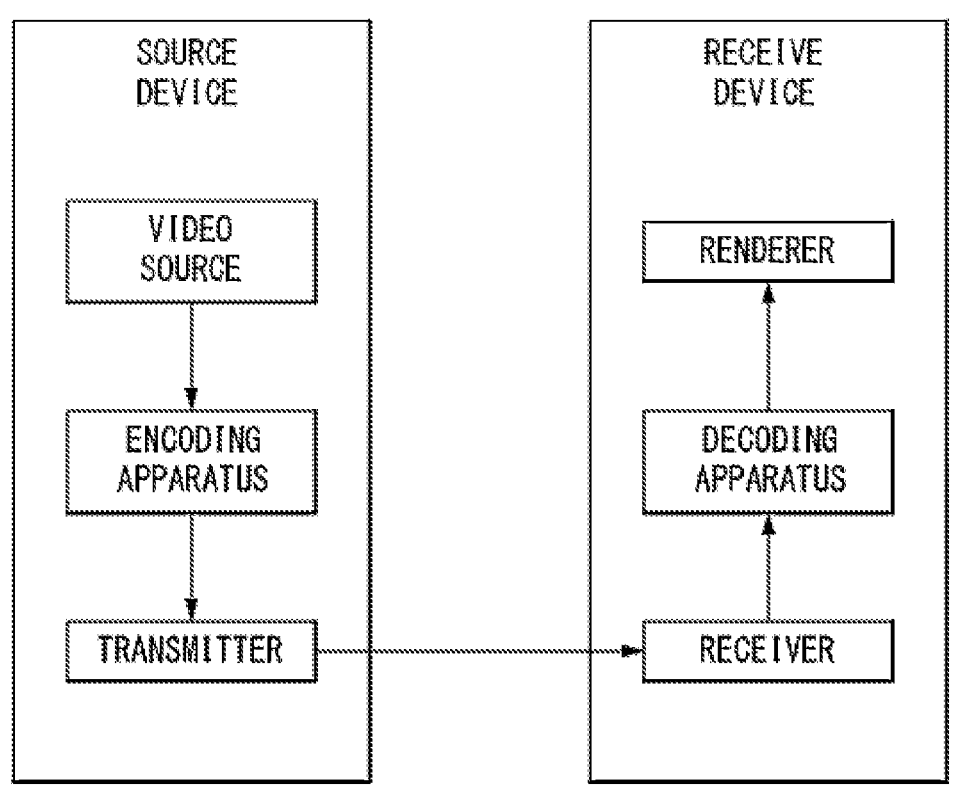

[FIG. 25]
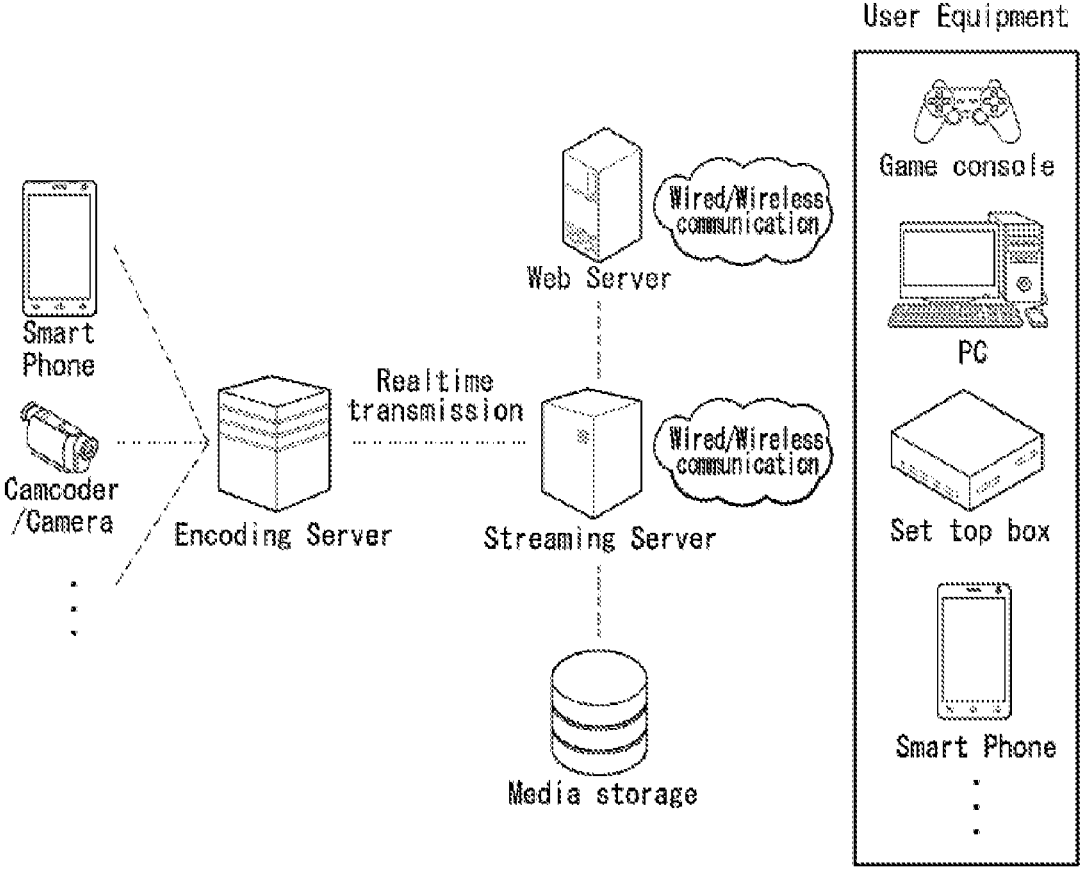

METHOD FOR PROCESSING IMAGE ON BASIS OF INTER-PREDICTION MODE AND APPARATUS THEREFOR

CROSS-REFERENCE TO RELATED APPLICATIONS

This application is a Continuation of U.S. patent application Ser. No. 18/107,782, filed on Feb. 9, 2023, which is a Continuation of U.S. patent application Ser. No. 17/093, 268, filed on Nov. 9, 2020, now U.S. Pat. No. 11,606,566, issued Mar. 14, 2023, which is a Continuation of International Application No. PCT/KR2019/005668, filed on May 10, 2019, now Publication Number WO 2019/216714, published Nov. 14, 2019, which claims the benefit of Korean Patent Application No. 10-2018-0053665 filed on May 10, 2018, the contents of which are all hereby incorporated by reference herein in their entirety.

TECHNICAL FIELD

The present disclosure relates to a still image or moving picture processing method, and more particularly, to a method for encoding/decoding a still image or a moving picture based on an inter prediction mode and an apparatus for supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An embodiment of the present disclosure provides a method for generating a refined merge candidate by using a merge offset.

Furthermore, an embodiment of the present disclosure provides a method for generating the refined merge candidate by using weighted averaging.

Furthermore, an embodiment of the present disclosure proposes a method for adding a candidate by using an average of candidates selected in a merge candidate list.

The technical objects of the present disclosure are not limited to the aforementioned technical objects, and other technical objects, which are not mentioned above, will be apparently appreciated by a person having ordinary skill in the art from the following description.

Technical Solution

In an aspect of the present disclosure, a method for decoding an image based on an inter-prediction mode may include: configuring a merge candidate list by using motion information of a spatial candidate and a temporal candidate adjacent to a current block; parsing a first syntax element indicating a particular candidate applied to inter-prediction of the current block among a predefined number of candidates in the merge candidate list; deriving a refined candidate by adding a motion vector offset to a motion vector of a candidate indicated by the first syntax element; and generating a prediction block of the current block by using the motion information of the refined candidate.

Preferably, the parsing of the first syntax element may be performed by parsing the first syntax element indicating the particular candidate applied to the inter-prediction of the current block between a first candidate and a second candidate in an order in which a merge index is allocated in the merge candidate list.

Preferably, the motion vector offset may be derived based on a motion vector offset precision indicating whether the motion vector offset has an integer pixel precision or a fractional pixel precision.

Preferably, the deriving of the refined candidate may include parsing a second syntax element indicating the motion vector offset precision, and the second syntax element may be transmitted through a sequence parameter set, a picture parameter set, or a slice header.

Preferably, the motion vector offset may be derived based on a value acquired by multiplying the motion vector offset precision by a non-zero integer.

Preferably, the configuring of the merge candidate list may further include adding, to the merge candidate list, a candidate generated by weighted averaging a pair of predefined candidates in the merge candidate list.

Preferably, the configuring of the merge candidate list may further include adding, to the merge candidate list, a candidate generated by averaging a pair of predefined candidates in the merge candidate list.

In another aspect of the present disclosure, an apparatus for decoding an image based on an inter-prediction mode may include: a merge candidate list configuring unit configuring a merge candidate list by using motion information of a spatial candidate and a temporal candidate adjacent to a current block; a first syntax element parsing unit parsing a first syntax element indicating a particular candidate applied to inter-prediction of the current block among a predefined number of candidates in the merge candidate list; a refined candidate deriving unit deriving a refined candidate by adding a motion vector offset to a motion vector of a candidate indicated by the first syntax element; and a prediction block generating unit generating a prediction block of the current block by using the motion information of the current block.

Preferably, the first syntax element parsing unit may parse the first syntax element indicating the particular candidate applied to the inter-prediction of the current block between a first candidate and a second candidate in an order in which a merge index is allocated in the merge candidate list.

Preferably, the motion vector offset may be derived based on a motion vector offset precision indicating whether the motion vector offset has an integer pixel precision or a fractional pixel precision.

Preferably, the refined candidate deriving unit may parse a second syntax element indicating the motion vector offset precision, and the second syntax element may be transmitted through a sequence parameter set, a picture parameter set, or a slice header.

Preferably, the motion vector offset may be derived based on a value acquired by multiplying the motion vector offset precision by a non-zero integer.

Preferably, the merge candidate list configuring unit may add, to the merge candidate list, a candidate generated by weighted averaging a pair of predefined candidates in the merge candidate list.

Preferably, the merge candidate list configuring unit may add, to the merge candidate list, a candidate generated by averaging a pair of predefined candidates in the merge candidate list.

Advantageous Effects

According to an embodiment of the present disclosure, various merge candidates with high reliability are additionally used to enhance prediction accuracy of a merge mode and compression performance.

Furthermore, according to an embodiment of the present disclosure, a motion vector of a merge candidate is refined through a motion vector offset to increase accuracy of motion estimation/compensation.

Effects obtainable in the present disclosure are not limited to the aforementioned effects and other unmentioned effects will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

FIG. 1 is a schematic block diagram of an encoding apparatus in which encoding of a video/image signal is performed as an embodiment to which the present disclosure is applied.

FIG. 2 is a schematic block diagram of a decoding apparatus in which decoding of a video/image signal is performed as an embodiment to which the present disclosure is applied.

FIG. 3 is a diagram illustrating an example of a multi-type tree structure to which the present disclosure may be applied.

FIG. 4 is a diagram illustrating a signaling mechanism of partitioning information of a quadtree with nested multi-type tree structure as an embodiment to which the present disclosure may be applied.

FIG. 5 is a diagram illustrating a method for splitting a CTU into multiple CUs based on a quadtree and nested multi-type tree structure as an embodiment to which the present disclosure may be applied.

FIG. 6 is a diagram illustrating a method for limiting ternary-tree splitting as an embodiment to which the present disclosure may be applied.

FIG. 7 is a diagram illustrating redundant partitioning patterns which may occur in binary-tree partitioning and ternary-tree partitioning as an embodiment to which the present disclosure may be applied.

FIGS. 8 and 9 are diagrams illustrating an inter prediction based video/image encoding method according to an embodiment of the present disclosure and an inter prediction unit in an encoding apparatus according to an embodiment of the present disclosure.

FIGS. 10 and 11 are diagrams illustrating an inter prediction based video/image decoding method according to an embodiment of the present disclosure and an inter prediction unit in a decoding apparatus according to an embodiment of the present disclosure.

FIG. 12 is a diagram for describing a neighboring block used in a merge mode or a skip mode as an embodiment to which the present disclosure is applied.

FIG. 13 is a flowchart illustrating a method for configuring a merging candidate list according to an embodiment to which the present disclosure is applied.

FIG. 14 is a flowchart illustrating a method for configuring a merging candidate list according to an embodiment to which the present disclosure is applied.

FIG. 15 is a diagram for describing a method for deriving an Advanced Temporal Motion Vector Prediction (ATMVP) candidate as an embodiment to which the present disclosure is applied.

FIG. 16 is a diagram for describing a method for deriving an Advanced Temporal Motion Vector Prediction (ATMVP) candidate as an embodiment to which the present disclosure is applied.

FIGS. 17 and 18 are diagrams illustrating a method for compressing temporal motion vector data and locations of spatial candidates used therefor according to an embodiment of the present disclosure.

FIG. 19 is a diagram illustrating a method for configuring a merging candidate list according to a conventional image compression technology as an embodiment to which the present disclosure may be applied.

FIG. 20 is a flowchart illustrating a method for generating a refined merge candidate as an embodiment to which the present disclosure is applied.

FIG. 21 is a diagram illustrating a motion vector offset used to generate a refined merge candidate as an embodiment to which the present disclosure is applied.

FIG. 22 is a flowchart illustrating a method for generating an inter prediction block according to an embodiment to which the present disclosure is applied.

FIG. 23 is a diagram illustrating an inter prediction device according to an embodiment to which the present disclosure is applied.

FIG. 24 illustrates a video coding system to which the present disclosure is applied.

FIG. 25 is an architectural diagram of a content streaming system as an embodiment to which the present disclosure is applied.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Hereinafter, for convenience of description, the processing unit may be referred to as a 'processing block' or a 'block'.

Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 is a schematic block diagram of an encoding apparatus which encodes a video/image signal as an embodiment to which the present disclosure is applied.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be implemented by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, more particularly in the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store the modified reconstructed picture to use it as a reference picture in the inter predictor 180. The memory 170 may store motion information of a block in which the motion information in the current picture is derived (or encoded) and/or motion information of blocks in an already reconstructed picture.

The stored motion information may be forwarded to the inter predictor 180 to be utilized as motion information of a spatial neighboring block or motion information of a temporal neighboring block. The memory 170 may store reconstructed samples of the reconstructed blocks in the current picture and forward it to the intra predictor 185.

FIG. 2 is an embodiment to which the disclosure is applied, and is a schematic block diagram of a decoding apparatus for decoding a video/image signal.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer (DPB), and may be implemented by a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, more particularly to the DPB of the memory 250. The various filtering methods may include deblocking filtering, a sample adaptive offset SAO, an adaptive loop filter ALF, and a bilateral filter, for example.

The (modified) reconstructed picture stored in the DPB of the memory 250 may be used as a reference picture in the inter predictor 260. The memory 250 may store motion information of a block in which the motion information in the current picture is derived (or decoded) and/or motion information of blocks in an already reconstructed picture. The stored motion information may be forwarded to the inter predictor 260 to be utilized as motion information of a spatial neighboring block or motion information of a temporal neighboring block. The memory 170 may store reconstructed samples of the reconstructed blocks in the current picture and forward it to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

The video/image coding method according to the present disclosure may be performed based on various detailed techniques, and each of the various detailed techniques is described as below. It is apparent to those skilled in the art that the techniques described herein may be associated with the related procedure such as a prediction, a residual process ((inverse) transform, (de) quantization, etc.), a syntax element coding, a filtering, a partitioning/splitting in a video/image encoding/decoding procedure described above and/or described below.

The block partitioning procedure according to the present disclosure may be performed in the image divider 110 of the encoding apparatus described above, and the partitioning related information may be (encoding) processed in the entropy encoder 190 and forwarded to the decoding apparatus in a bitstream format. The entropy decoder 210 of the decoding apparatus may obtain a block partitioning structure of a current picture based on the partitioning related information obtained from the bitstream, and based on it, may perform a series of procedure (e.g., prediction, residual processing, block reconstruction, in-loop filtering, etc.) for an image decoding.

Partitioning of picture into CTUs

Pictures may be divided into a sequence of coding tree units (CTUs). A CTU may correspond to a coding tree block (CTB). Alternatively, a CTU may include a coding tree block of luma samples and two coding tree blocks of corresponding chroma samples. In other words, for a picture including three types of sample arrays, a CTU may include an N×N block of luma samples and two corresponding samples of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

A CTU may be divided into CUs based on a quad-tree (QT) structure. The quad-tree structure may be called as a quaternary structure. This is for reflecting various local characteristics. Meanwhile, in the present disclosure, a CTU may be divided based on a multi-type tree structure partitioning including a binary-tree (BT) and a ternary-tree (TT) as well as the quad-tree. Hereinafter, QTBT structure may include the quad-tree and binary-tree structures, and QTBTTT may include partitioning structures based on the binary-tree and ternary-tree. Alternatively, the QTBT structure may also include partitioning structures based on the quad-tree, binary-tree and ternary-tree. In the coding tree structure, a CU may have a square or rectangle shape. A CTU may be divided into a quad-tree structure, first. And then, leaf nodes of the quad-tree structure may be additionally divided by the multi-type tree structure.

FIG. 3 is a diagram illustrating an example of a multi-type tree structure as an embodiment to which the present disclosure may be applied.

In an embodiment of the present disclosure, a multi-type tree structure may include 4 split types as shown in FIG. 3. The 4 split types may include a vertical binary splitting (SPLIT_BT_VER), a horizontal binary splitting (SPLIT_BT_HOR), a vertical ternary splitting (SPLIT_TT_VER) and a horizontal ternary splitting (SPLIT_TT_HOR). The leaf nodes of the multi-type tree structure may be called as CUs. Such CUs may be used for prediction and transform procedure. In the present disclosure, generally, a CU, a PU and a TU may have the same block size. However, in the case that a maximum supported transform length is smaller than a width or a height of a color component, a CU and a TU may have different block sizes.

FIG. 4 is a diagram illustrating a signaling mechanism of partition split information of a quadtree with nested multi-type tree structure as an embodiment to which the present disclosure may be applied.

Here, a CTU may be treated as a root of a quad-tree and initially partitioned into a quad-tree structure. Each quad-tree leaf node may be further partitioned into a multi-type tree structure later. In the multi-type tree structure, a first flag (e.g., mtt_split_cu_flag) is signaled to indicate whether the corresponding node is further partitioned. In the case that the corresponding node is further partitioned, a second flag (e.g., mtt_split_cu_verticla_flag) may be signaled to indicate a splitting direction. Later, a third flag (e.g., mtt_split_cu_binary_flag) may be signaled to indicate whether the split type is a binary split or a ternary split. For example, based on the mtt_split_cu_vertical_flag and the mtt_split_cu_binary_flag, a multi-type tree splitting mode (MttSplitMode) may be derived as represented in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is a diagram illustrating a method of partitioning a CTU into multiple CUs based on a quadtree and nested multi-type tree structure as an embodiment to which the present disclosure may be applied.

Here, bolded block edges represent a quad-tree partitioning, and the remaining edges represent a multi-type tree partitioning. The quad-tree partition with nested multi-type tree may provide a contents-adapted coding tree structure. A CU may correspond to a coding block (CB). Or, a CU may include a coding block of luma samples and two coding blocks of corresponding chroma samples. A size of CU may be great as much as a CTU or may be small as 4×4 in a luma sample unit. For example, in the case of 4:2:0 color format (or chroma format), a maximum chroma CB size may be 64×64, and a minimum chroma CB size may be 2×2.

In the present disclosure, for example, a maximum supported luma TB size may be 64×64, and a maximum supported chroma TB size may be 32×32. In the case that a width or a height of a CB partitioned according to the tree structure is greater than a maximum transform width or height, the CB may be further partitioned until a TB size limit in horizontal and vertical directions are satisfied automatically (or implicitly).

Meanwhile, for the quad-tree coding tree scheme with nested multi-type free, the following parameters may be defined or recognized as SPS syntax element.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size As an example of the quad-tree coding tree scheme with nested multi-type tree, a CTU size may be set to 128×128 luma samples and 64×64 blocks of two corresponding chroma samples (in 4:2:0 chroma sample). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quad-tree partitioning may be applied to a CTU and generate quad-tree leaf nodes. The quad-tree leaf node may be called a leaf QT node. The quad-tree leaf nodes may have a size from 16×16 size (i.e. the MinOTSize) to 128×128 size (i.e. the CTU size). In the case that a leaf QT node is 128×128, the leaf QT node may not be partitioned into a binary-tree/ternary-tree. This is because the leaf QT node exceeds MaxBtsize and MaxTtsize (i.e., 64×64) even in the case the leaf QT node is partitioned. In other case, the leaf QT node may be additionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partitioning may be considered. In the case that a height of the multi-type tree node is equal to MinBtSize and smaller than or equal to 2×MinTtSize, no more additional vertical partitioning may be considered.

FIG. 6 is a diagram illustrating a method for limiting a ternary-tree split as an embodiment to which the present disclosure may be applied.

Referring to FIG. 6, in order to support 64×64 luma block and 32×32 chroma pipeline design in a hardware decoder, a TT split may be limited in a specific case. For example, in the case that a width or a height of a luma coding block is greater than a predetermined specific value (e.g., 32, 64), as shown in FIG. 6, a TT split may be limited.

In the present disclosure, the coding tree scheme may support that a luma and chroma block have a separate block tree structure. With respect to P and B slices, luma and chroma CTBs in a single CTU may be limited to have the same coding tree structure. However, with respect to I slices, luma and chroma blocks may have respective individual block tree structures. In the case that the individual block tree mode is applied, a luma CTB may be partitioned into CUs based on a specific coding tree structure, and a chroma CTB may be partitioned into chroma CUs based on a different coding tree structure. This may mean that a CU in I slice may include a coding block of chroma component or coding blocks of two chroma component, and a CU in P or B slice may include blocks of three color components.

In the "Partitioning of the CTUs using a tree structure" described above, the quad-tree coding tree scheme with nested multi-type tree is described, but a structure in which a CU is partitioned is not limited thereto. For example, BT structure and TT structure may be interpreted as the concept included in the Multiple Partitioning Tree (MPT) structure, and it may be interpreted that a CU is partitioned through QT structure and MPT structure. In an example that a CU is partitioned through QT structure and MPT structure, a syntax element including information on the number of blocks to which a leaf node of QT structure is partitioned (e.g., MPT_split_type) and a syntax element including information a direction to which a leaf node of QT structure is partitioned between vertical and horizontal directions (e.g., MPT_split_mode) may be signaled, and a split structure may be determined.

In another example, a CU may be partitioned in a method different from QT structure, BT structure or TT structure. That is, different from that a CU of a lower layer depth is partitioned to ¼ size of a CU of a higher layer depth according to QT structure, a CU of a lower layer depth is partitioned to ½ size of a CU of a higher layer depth according to BT structure, or a CU of a lower layer depth is partitioned to ¼ size or ½ size of a CU of a higher layer depth according to TT structure, a CU of a lower layer depth may be partitioned into ⅕, ⅓, ⅜, ⅗, ⅔ or ⅝ size of a CU of a higher layer depth in some cases, but a method of partitioning a CU is not limited thereto.

In the case that a portion of a tree node block exceeds a bottom or right picture boundary, the corresponding tree node block may be limited that all samples of all coded CUs are located within the picture boundaries. In this case, for example, the following split rules may be applied.

If a portion of a tree node block exceeds both the bottom and the right picture boundaries,
If the block is a QT node and the size of the block is larger than the minimum QT size, the block is forced to be split with QT split mode.
Otherwise, the block is forced to be split with SPLIT_BT_HOR mode Otherwise if a portion of a tree node block exceeds the bottom picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_HOR mode.

Otherwise (the block is a BTT node or the size of the block is smaller than or equal to the minimum QT size), the block is forced to be split with SPLIT_BT_HOR mode.

Otherwise if a portion of a tree node block exceeds the right picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_VER mode.

Otherwise (the block is a BTT node or the size of the block is smaller than or equal to the minimum QT size), the block is forced to be split with SPLIT_BT_VER mode.

The quadtree coding block structure accompanying the multi-type tree may provide a very flexible block partitioning structure. Due to spitting types supported to the multi-type tree, different splitting patterns may potentially cause the same coding block structure result in some cases. Generation of the redundant splitting patterns is limited to reduce a data mount of partitioning information. This will be described with reference to following drawings.

FIG. 7 is a diagram illustrating redundant partitioning patterns which may occur in binary-tree partitioning and ternary-tree partitioning as an embodiment to which the present disclosure may be applied.

As illustrated in FIG. 7, two levels of consecutive binary splits in one direction have the same coding block structure as binary splitting for a center partition after the ternary splitting. In such a case, binary tree splitting (in the given direction) for the center partition of the ternary tree splitting may be limited. The limitation may be applied to CUs of all pictures. When specific splitting is limited, signaling of syntax elements may be modified by reflecting such a limitation case and the number of bits signaled for partitioning may be reduced through the modified signaling. For example, like the example illustrated in FIG. 7, when the binary tree splitting for the center partition of the CU is limited, a syntax element mtt_split_cu_binary_flag indicating whether the splitting is the binary splitting or the ternary splitting may not be signaled and the value may be inferred as 0 by the decoder.

Prediction

In order to reconstruct a current processing unit in which decoding is performed, decoded parts of a current picture or other pictures including the current processing unit may be used.

A picture using only the current picture for reconstruction, i.e., performing the intra prediction may be referred to as an intra picture or an I picture (slice), a picture (slice) using up to one motion vector and reference index in order to predict each unit may be referred to as a predictive picture or P picture (slice), and a picture (slice) using up to two motion vectors and reference indexes may be referred to as a bi-predictive picture or B picture (slice).

The intra prediction means a prediction method that derives a current processing block from a data element (e.g., a sample value, etc.) of the same decoded picture (or slice). In other words, the intra prediction means a method for predicting a pixel value of the current processing block by referring to reconstructed areas in the current picture.

Hereinafter, the inter prediction will be described in more detail.

Inter Prediction

The inter prediction means a prediction method of deriving the current processing block based on data elements (e.g., the sample value or motion vector) of pictures other than the current picture. In other words, the intra prediction means a method for predicting a pixel value of the current processing block by referring to reconstructed areas in other reconstructed pictures other than the current picture.

The inter prediction (inter-picture prediction) as a technique for eliminating redundancy existing between pictures is mostly performed by motion estimation and motion compensation.

In the present disclosure, a detailed description of the inter prediction method described in FIGS. 1 and 2 above is made and the decoder may be represented as an inter prediction based video/image decoding method of FIG. 10 and an inter-prediction unit in the decoding apparatus of FIG. 11 to be described below. Moreover, the encoder may be represented as an inter prediction based video/image encoding method of FIG. 8 and the inter-prediction unit in the encoding apparatus of FIG. 9 to be described below. In addition, encoded data by FIGS. 8 and 9 may be stored in the form of a bitstream.

The prediction unit of the encoding apparatus/decoding apparatus may derive the predicted sample by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index.

In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information.

In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block.

The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

FIGS. 8 and 9 are diagrams illustrating an inter prediction based video/image encoding method according to an embodiment of the present disclosure and an inter prediction unit in an encoding apparatus according to an embodiment of the present disclosure.

Referring to FIGS. 8 and 9, S801 may be performed by the inter-prediction unit 180 of the encoding apparatus and S802 may be performed by the residual processing unit of the encoding apparatus. Specifically, S802 may be performed the subtraction unit 115 of the encoding apparatus. In S803, prediction information may be derived by the inter-prediction unit 180 and encoded by the entropy encoding unit 190. In S803, residual information may be derived by the residual processing unit and encoded by the entropy encoding unit 190. The residual information is information on the residual samples. The residual information may include information on quantized transform coefficients for the residual samples.

As described above, the residual samples may be derived as transform coefficients by the transform unit 120 of the encoding apparatus and the transform coefficients may be derived as quantized transform coefficients by the quantization unit 130. Information on the quantized transform coefficients may be encoded through a residual coding procedure by the entropy encoding unit 190.

The encoding apparatus performs inter prediction for the current block (S801). The encoding apparatus may derive the inter prediction mode and the motion information of the current block and generate predicted samples of the current block. Here, an inter prediction mode determining procedure, a motion information deriving procedure, and a generation procedure of the prediction samples may be simultaneously performed and any one procedure may be performed earlier than other procedures. For example, the inter-prediction unit 180 of the encoding apparatus may include a prediction mode determination unit 181, a motion information derivation unit 182, and a predicted sample derivation unit 183, and the prediction mode determination unit 181 may determine the prediction mode for the current block, the motion information derivation unit 182 may derive the motion information of the current block, and the predicted sample derivation unit 183 may derive motion samples of the current block.

For example, the inter-prediction unit 180 of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A) MVP mode is applied to the current block, the encoding apparatus may configure an (A) MVP candidate list to be described below and use a motion vector of a selected mvp candidate among motion vector predictor (mvp) candidates included in the (A) MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A) MVP mode is applied, the value of the reference picture index may be configured as reference picture index information and separately signaled to the decoding apparatus.

The encoding apparatus may derive the residual samples based on the predicted samples (S802). The encoding apparatus may derive the residual samples by comparing original samples of the current block and the predicted samples.

The encoding apparatus encodes image information including prediction information and residual information (S803). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information.

Further, the information on the motion information may include information indicating whether to apply L0 prediction, L1 prediction, or bi-prediction. The residual information is information on the residual samples. The residual information may include information on quantized transform coefficients for the residual samples.

An output bitstream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstructed picture (or reconstructed samples or reconstructed blocks) in the memory and utilize the reconstructed picture as the reference picture. The in-loop filtering procedure may be further applied to the reconstructed picture as described above.

FIGS. 10 and 11 are diagrams illustrating an inter prediction based video/image decoding method according to an embodiment of the present disclosure and an inter prediction unit in a decoding apparatus according to an embodiment of the present disclosure.

Referring to FIGS. 10 and 11, the decoding apparatus may perform an operation corresponding to the operation performed by the encoding apparatus. The decoding apparatus may perform the prediction for the current block based on received prediction information and derive the prediction samples.

S1001 to S1003 may be performed by the inter-prediction unit 260 of the decoding apparatus and the residual information of S1004 may be obtained from the bitstream by the entropy decoding unit 210 of the decoding apparatus. The residual processing unit of the decoding apparatus may derive the residual samples for the current block based on the residual information. Specifically, the dequantization unit 220 of the residual processing unit may derive transform coefficients by performing dequantization based on quantized transform coefficients derived based on the residual information and the inverse transform unit 230 of the residual processing unit may derive the residual samples for the current block by performing inverse transform for the transform coefficients. S1005 may be performed by the addition unit 235 or the reconstruction unit of the decoding apparatus.

Specifically, the decoding apparatus may determine the prediction mode for the current block based on the received prediction information (S1001). The decoding apparatus may determine which inter prediction mode is applied to the current block based on the prediction mode information in the prediction information.

For example, it may be determined whether the merge mode or the (A) MVP mode is applied to the current block based on the merge flag. Alternatively, one of various inter prediction mode candidates may be selected based on the mode index. The inter prediction mode candidates may include a skip mode, a merge mode, and/or an (A) MVP mode or may include various inter prediction modes to be described below.

The decoding apparatus derives the motion information of the current block based on the determined inter prediction mode (S1002). For example, when the skip mode or the merge mode is applied to the current block, the decoding apparatus may configure the merging candidate list to be described below and select one merge candidate among the merge candidates included in the merging candidate list. The selection may be performed based on the selection information (merge index). The motion information of the current block may be derived by using the motion information of the selected merge candidate. The motion information of the selected merge candidate may be used as the motion information of the current block.

As another example, when an (A) MVP mode is applied to the current block, the decoding apparatus may configure an (A) MVP candidate list to be described below and use a motion vector of a selected mvp candidate among motion vector predictor (mvp) candidates included in the (A) MVP candidate list as the mvp of the current block. The selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without a candidate list configuration as described below and in this case, the motion information of the current block may be derived according to a procedure disclosed in the prediction mode to be described below. In this case, the candidate list configuration may be omitted.

The decoding apparatus may generate the predicted samples for the current block based on the motion information of the current block (S1003). In this case, the reference picture may be derived based on the reference picture index of the current block and the predicted samples of the current block may be derived by using the samples of the reference block indicated by the motion vector of the current block on the reference picture. In this case, as described below, in some cases, a prediction sample filtering procedure for all or some of the prediction samples of the current block may be further performed.

For example, the inter-prediction unit 260 of the decoding apparatus may include a prediction mode determination unit 261, a motion information derivation unit 262, and a predicted sample derivation unit 263, and the prediction mode determination unit 261 may determine the prediction mode for the current block based on the received prediction mode information, the motion information derivation unit 262 may derive the motion information (the motion vector and/or reference picture index) of the current block based on the information on the received motion information, and the predicted sample derivation unit 263 may derive the predicted samples of the current block.

The decoding apparatus generates the residual samples for the current block based on the received residual information (S1004). The decoding apparatus may generate the reconstructed samples for the current block based on the predicted samples and the residual samples and generate the reconstructed picture based on the generated reconstructed samples (S1005). Thereafter, the in-loop filtering procedure may be further applied to the reconstructed picture as described above.

As described above, the inter prediction procedure may include an inter prediction mode determining step, a motion information deriving step depending on the determined prediction mode, and a prediction performing (predicted sample generating) step based on the derived motion information.

Determination of Inter Prediction Mode

Various inter prediction modes may be used for predicting the current block in the picture. For example, various modes including a merge mode, a skip mode, an MVP mode, an affine mode, and the like may be used. A decoder side motion vector refinement (DMVR) mode, an adaptive motion vector resolution (AMVR) mode, etc., may be further used as an ancillary mode. The affine mode may be referred to as an affine motion prediction mode. The MVP mode may be referred to as an advanced motion vector prediction (AMVP) mode.

The prediction mode information indicating the inter prediction mode of the current block may be signaled from the encoding apparatus to the decoding apparatus. The prediction mode information may be included in a bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags.

For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may be configured as one candidate of the merging candidate list or MVP candidate list as described below.

Derivation of Motion Information According to Inter Prediction Mode

The inter prediction may be performed by using the motion information of the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on an SAD between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

Merge Mode and Skip Mode

FIG. 12 is a diagram for describing a neighboring block used in a merge mode or a skip mode as an embodiment to which the present disclosure is applied.

When the merge mode is applied, the motion information of the current prediction block is not directly transmitted and the motion information of the current prediction block is derived by using the motion information of a neighboring prediction block. Accordingly, flag information indicating that the merge mode is used and a merge index indicating which neighboring prediction block is used are transmitted to indicate the motion information of the current prediction block.

The encoder may search a merge candidate block used for deriving the motion information of the current prediction block in order to perform the merge mode. For example, up to five merge candidate blocks may be used, but the present disclosure is not limited thereto. In addition, the maximum number of merge candidate blocks may be transmitted in a slider header (or tile group header) and the present disclosure is not limited thereto. After finding the merge candidate blocks, the encoder may generate the merging candidate list and selects a merge candidate block having the smallest cost among the merge candidate blocks as a final merge candidate block.

The present disclosure provides various embodiments for the merge candidate block constituting the merging candidate list.

As the merging candidate list, for example, five merge candidate blocks may be used. For example, four spatial merge candidates and one temporal merge candidate may be used. As a specific example, in the case of the spatial merge candidate, the blocks illustrated in FIG. 12 may be used as the spatial merge candidate.

FIG. 13 is a flowchart illustrating a method for configuring a merging candidate list according to an embodiment to which the present disclosure is applied.

Referring to FIG. 13, a coding apparatus (encoder/decoder) inserts the spatial merge candidates derived by searching the spatial neighboring blocks of the current block into the merging candidate list (S1301). For example, the spatial neighboring blocks may include a bottom left corner neighboring block, a left neighboring bock, a top right corner neighboring block, a top neighboring block, and a top left corner neighboring block of the current block. However, this is an example and additional neighboring blocks including a right neighboring block, a bottom neighboring block, a bottom right neighboring block, and the like may be further used as the spatial neighboring blocks in addition to the spatial neighboring blocks. The coding apparatus may derive available blocks by searching the spatial neighboring blocks based on a priority and derive the motion information of the detected blocks as the spatial merge candidates. For example, the encoder and decoder may search five blocks illustrated in FIG. 12 in the order of A1, B1, B0, A0, and B2 and sequentially index the available candidates and configure the indexed candidates as the merging candidate list.

The coding apparatus inserts the temporal merge candidate derived by searching the temporal neighboring block of the current block into the merging candidate list (S1302). The temporal neighboring block may be positioned on the reference picture which is a different picture from the current picture at which the current block is positioned. The reference picture at which the temporal neighboring block is positioned may be referred to as a collocated picture or a col picture. The temporal neighboring block may be searched in the order of a bottom right corner neighboring block and a bottom right center block of a co-located block for the current block on the col picture.

Meanwhile, when motion data compression is applied, specific motion information may be stored as representative motion information in the col picture for each predetermined storage unit. In this case, motion information for all blocks in the predetermined storage unit need not be stored, and as a result, a motion data compression effect may be obtained. In this case, the predetermined storage unit may be predetermined for each $16 \times 16$ sample unit or $8 \times 8$ sample unit or size information for the predetermined storage unit may be signaled from the encoder to the decoder. When the motion data compression is applied, the motion information of the temporal neighboring block may be replaced with the representative motion information of the predetermined storage unit at which the temporal neighboring block is positioned.

In other words, in this case, in terms of implementation, the temporal merge candidate may be derived based on motion information of a prediction block covering a location subject to arithmetic right shift and then arithmetic left shift by a predetermined value based on a coordinate (top left sample position) of the temporal neighboring block other than a prediction block positioned on the coordinate of the temporal neighboring block. For example, when the predetermined storage unit is a 2n×2n sample unit, if the coordinate of the temporal neighboring block is (xTnb, yTnb), motion information of a prediction block positioned at ((xTnb>>n)<<n), (yTnb>>n)<<n)) which is a modified location may be used for the temporal merge candidate.

Specifically, for example, when the predetermined storage unit is a 16×16 sample unit, if the coordinate of the temporal neighboring block is (xTnb, yTnb), motion information of a prediction block positioned at ((xTnb>>4)<<4), (yTnb>>4) <<4)) which is a modified location may be used for the temporal merge candidate. Alternatively, for example, when the predetermined storage unit is an 8×8 sample unit, if the coordinate of the temporal neighboring block is (xTnb, yTnb), motion information of a prediction block positioned at ((xTnb>>3)<<3), (yTnb>>3)<<3)) which is a modified location may be used for the temporal merge candidate.

The coding apparatus may check whether the current number of merge candidates is smaller than the maximum number of merge candidates (S1303). The maximum number of merge candidates may be predefined or signaled from the encoder to the decoder. For example, the encoder may generate information on the maximum number of merge candidates and encode the generated information and transfer the encoded information to the decoder in the form of a bitstream. When the maximum number of merge candidates is completely filled, a subsequent candidate addition process may not be performed.

As the checking result, when the current number of merge candidates is smaller than the maximum number of merge candidates, the coding apparatus inserts additional merge candidates into the merging candidate list (S1304). The additional merge candidates may include, for example, ATMVP, a combined bi-predictive merge candidate (when a slice type of current slice is type B) and/or a zero-vector merge candidate.

As the checking result, when the current number of merge candidates is not smaller than the maximum number of merge candidates, the coding apparatus may terminate the configuration of the merging candidate list. In this case, the encoder may select an optimal merge candidate among the merge candidates constituting the merging candidate list based on rate-distortion (RD) cost and signal selection information (e.g., merge index) indicating the selected merge candidate to the decoder. The decoder may select the optimal merge candidate based on the merging candidate list and the selection information.

The motion information of the selected merge candidate may be used as the motion information of the current block and the predicted samples of the current block may be derived based on the motion information of the current block as described above. The encoder may derive the residual samples of the current block based on the predicted samples and signal the residual information for the residual samples to the decoder. The decoder may generate the reconstructed samples based on the residual samples derived based on the residual information and the predicted samples and generate the reconstructed picture based on the generated reconstructed samples as described above.

When the skip mode is applied, the motion information of the current block may be derived by the same method as the case where the merge mode is applied as above. However, when the skip mode is applied, a residual signal for the corresponding block is omitted, and as a result, the predicted samples may be directly used as the reconstructed samples.

MVP Mode

FIG. 14 is a flowchart illustrating a method for configuring a merging candidate list according to an embodiment to which the present disclosure is applied.

When the motion vector prediction (MVP) mode is applied, a motion vector predictor (mvp) candidate list may be generated by using the motion vector of the reconstructed spatial neighboring block (e.g., may be the neighboring block described in FIG. 12 above) and/or the motion vector corresponding to the temporal neighboring block (or Col block). In other words, the motion vector of the reconstructed spatial neighboring block and/or the motion vector corresponding to the temporal neighboring block may be used as the motion vector predictor candidate.

The information on the prediction may include selection information (e.g., an MVP flag or MVP index) indicating an optimal motion vector predictor candidate selected among the motion vector predictor candidates included in the list. In this case, the predictor may select the motion vector predictor of the current block among the motion vector predictor candidates included in the motion vector candidate list by using the selected information. The predictor of the encoding apparatus may obtain a motion vector difference (MVD) between the motion vector and the motion vector predictor of the current block and encode the obtained MVD and output the encoded MVD in the form of the bitstream. In other words, the MVD may be obtained by a value obtained by subtracting the motion vector predictor from the motion vector of the current block. In this case, the predictor of the decoding apparatus may obtain the motion vector difference included in the information on the prediction and derive the motion vector of the current block by adding the motion vector difference and the motion vector predictor. The predictor of the decoding apparatus may obtain or derive the reference picture index indicating the reference picture from the information on the prediction. For example, the motion vector predictor candidate list may be configured as illustrated in FIG. 14.

Advanced Temporal Motion Vector Prediction (ATMVP)

FIG. 15 is a diagram for describing a method for deriving an Advanced Temporal Motion Vector Prediction (ATMVP) candidate as an embodiment to which the present disclosure is applied.

Referring to FIG. 15, the ATMVP is a method for deriving the motion information for subblocks of the coding unit based on motion information of collocated blocks of a temporally neighboring picture. Therefore, the performance of a temporal motion vector prediction (TMVP) may be enhanced and general or worst-case complexity may be reduced. In the present disclosure, the ATMVP may be referred to as a subblock-based temporal merge candidate, SbTMVP.

According to an embodiment of the present disclosure, the ATMVP may be derived by the following process.

First, when the neighboring coding unit is available and the motion vector of the available coding unit is different from the motion vector in the current candidate list, the encoder/decoder may add the motion vector from the spatial neighboring coding units. As one example, the process may be performed in the order of A1, B1, B0, A0, and B2 illustrated in FIG. 12 described above. As another example, for improvement of the complexity, in the process, the ATMVP may be derived by using only a motion vector of a block at a fixed location (e.g., A1 location).

The encoder/decoder may use a first motion vector candidate among No available spatial candidates in order to determine a location to derive the collocated picture and the motion information of each subblock. Here, No represents the number of available spatial candidates. If No is 0, the collocated picture and a collocated position having a motion of 0 may be used for deriving the motion information of each subblock.

When multiple reference pictures are used, collocated pictures of different coding units may not be the same as each other in the ATMVP. A fact that different coding units in the current picture have different collocated pictures for deriving the ATMVP means that motion information fields of multiple reference pictures should be derived and this is not preferable because this increases a memory bandwidth.

Accordingly, the present disclosure provides a simpler design of using the same collocated picture when deriving the ATMVP. For example, a method that uses the same collocated picture may be defined in a slice (or tile group) header, but the present disclosure is not limited thereto. As one example, at a block level, when the reference picture of neighboring block A is different from the collocated picture, the motion vector of neighboring block A may be scaled based on a temporal motion vector scaling method. In addition, the scaled motion vector of neighboring block A may be used in the ATMVP.

FIG. 16 is a diagram for describing a method for deriving an Advanced Temporal Motion Vector Prediction (ATMVP) candidate as an embodiment to which the present disclosure is applied.

Referring to FIG. 16, in an embodiment of the present disclosure, since TMVP using the motion vector of the right-bottom block of the current block or a temporal neighboring block (or colPB) at the center location of the current block does not reflect an intra-picture motion, the encoder/decoder may use the motion vector of the colPB at a location indicated by the neighboring block of the neighboring block as the MVP.

For example, the encoder/decoder may find the motion vector of a first available spatial neighboring block while checking the blocks like the merge candidate configuration order illustrated in FIG. 16. In addition, a location indicated by the motion vector in the reference picture may be derived as col-PB (i.e., ATMVP candidate).

Further, the motion vector may be used as the motion vector of a corresponding block in units of each subblock. In this case, when there is no motion vector in a specific subblock, the motion vector of a center block positioned at the center of the corresponding block may be used as the motion vector for an unavailable subblock and stored as a representative motion vector.

Temporal Motion Vector Data Storage Reduction

An embodiment of the present disclosure proposes a method for reducing a temporal motion vector storage based on motion vector data of spatial candidates for compression of temporal motion vector data.

FIGS. 17 and 18 are diagrams illustrating a method for compressing temporal motion vector data and locations of spatial candidates used therefor according to an embodiment of the present disclosure.

Referring to FIG. 17, in an embodiment of the present disclosure, when the spatial candidate is predicted by the inter prediction, the motion vector of the spatial candidate may be configured as a default motion vector for compression. For example, a maximum of five spatial candidates may be used as reference time motion information for deriving a default temporal motion vector. As an embodiment, the five spatial candidates may be configured as illustrated in FIG. 18.

Further, the temporal motion vector data may be compressed based on the motion vectors of the spatial candidates. An order of searching the spatial candidate may be illustrated in FIG. 17. The spatial candidates may be confirmed according to the order of a center block C, a top left block TL, a top right block TR, a bottom left block BL, and a bottom right block BR. This is just an embodiment and the present disclosure is not limited thereto and other combinable orders may be applied.

First, the encoder/decoder may check whether the center block C is inter-predicted. If the center block C is inter-predicted, the encoder/decoder may configure the motion vector of the center block C as a default for predicting the motion vector.

If the center block C is not inter-predicted, the encoder/decoder may check whether the top left block TL is inter-predicted. If the top left block TL is inter-predicted, the encoder/decoder may configure the motion vector of the top left block TL as the default for predicting the motion vector.

If the top left block TL is not inter-predicted, the encoder/decoder may check whether the top right block TR is inter-predicted. If the top right block TR is inter-predicted, the encoder/decoder may configure the motion vector of the top right block TR as the default for predicting the motion vector.

If the top right block TR is not inter-predicted, the encoder/decoder may check whether the bottom left block BL is inter-predicted. If the bottom left block BL is inter-predicted, the encoder/decoder may configure the motion vector of the bottom left block BL as the default for predicting the motion vector.

If the bottom left block BL is not inter-predicted, the encoder/decoder may check whether the bottom right block BR is inter-predicted. If the bottom right block BR is inter-predicted, the encoder/decoder may configure the motion vector of the bottom right block BR as the default for predicting the motion vector.

If the bottom right block BR is not inter-predicted, the encoder/decoder may configure the intra mode as the default.

Through such a process, the encoder/decoder may compress a default motion vector into motion information.

Embodiment of Performing ATMVP Based on Adaptive Subblock Size

An embodiment of the present disclosure proposes a method for performing ATMVP based on an adaptive subblock size. For example, a subblock size used for deriving the ATMVP may be adaptively applied at a slice level.

Meanwhile, if ATMVP motion information is derived in units of 4×4 blocks, there may be a problem in that motion derivation and motion compensation are performed every 4×4 subblocks in one ATMVP coding unit.

In order to solve the problem, the encoder may signal to the decoder one default subblock size used for ATMVP motion derivation at a sequence level.

As another example, when the default subblock size is used in a current slice, a flag may be signaled at a picture or slice level. If the flag is false, the ATMVP subblock size may be additionally signaled in a slice header.

28

Embodiment of Limiting Area for Deriving Collocated Block

In the present disclosure, an area of a collocated block for the ATMVP may include an N×N block of one column in a current CTU and a collocated picture. For example, the N×N block may be the 4×4 block, but the present disclosure is not limited thereto.

An ATMVP collocated block identified by the motion vector of the merge candidate is positioned outside the limited area, the ATMVP collocated block may move to be positioned in the limited area. For example, the ATMVP collocated block may move to be positioned on a closest boundary in the limited area.

Embodiment of Deriving Subblock-Based Temporal Merging Candidate

In an embodiment of the present disclosure, the encoder/decoder may add, to a subblock merging candidate list, motion information of a collocated block (or collocated subblock in a collocated picture specified based on motion information of a spatially neighboring block as a subblock-based temporal merging candidate.

In the present disclosure, the motion information of the spatially neighboring block may be referred to as the temporal motion vector. As the embodiment, when a width and a height of a current coding block are equal to or larger than predetermined specific sizes, the encoder/decoder may derive the subblock-based temporal merging candidate. For example, the predetermined specific sizes may be 8.

As the embodiment, the encoder/decoder may configure motion information of a first spatial candidate among available spatial candidates as the time motion vector. As an example, the encoder/decoder may search the available spatial candidates in the order of A1, B1, B0, and A0. In this case, the encoder/decoder may configure a spatial candidate in which the reference picture is the same as the collocated picture among the available spatial candidates as the time motion vector. As another example, the encoder/decoder may check whether one fixed-location spatial candidate is available and when the fixed location spatial candidate is available, the encoder/decoder may configure the motion vector of the corresponding spatial candidate as the temporal motion vector. For example, the one fixed-location spatial candidate may be configured as a block of location A1.

Further, the encoder/decoder may specify the location of the collocated block in the collocated picture by using the temporal motion vector. As an example, Equation 1 described above may be used.

$$xColCb = \qquad \text{[Equation 1]}$$

$$\text{Clip3}(xCtb, \text{Min}(CurPicWidthInSamplesY - 1, xCtb +$$

$$(1 \ll CtbLog2SizeY) + 3), xColCtrCb + (tempMv[0] \gg 4))$$

$$yColCb = \text{Clip3}$$

$$(yCtb, \text{Min}(CurPicHeightInSamplesY - 1, yCtb + (1 \ll CtbLog2SizeY) - 1),$$

$$yColCtrCb + (tempMv[1] \gg 4))$$

Here, (xColCtrCb, yColCtrCb) represents a top-left sample location of a collocated coding block including a top-right sample of a center location and tempMv represents the temporal motion vector.

Further, the encoder/decoder may determine a location to derive the motion information of each subblock in the current coding block in units of subblocks. In an embodiment, the location of the collocated subblock in the collocated picture may be derived by using Equation 2 below.

$$xColSb = \text{Clip3}(xCtb, \text{Min}(CurPicWidthInSamplesY - 1, \qquad \text{[Equation 2]}$$

$$xCtb + (1 \ll CtbLog2SizeY) + 3), xSb + (tempMv[0] \gg 4))$$

$$yColSb = \text{Clip3}(yCtb, \text{Min}(CurPicHeightInSamplesY - 1,$$

$$yCtb + (1 \ll CtbLog2SizeY) - 1), ySb + (tempMv[1] \gg 4))$$

Here, (xSb, ySb) represents the location of a current subblock.

In an embodiment, when the current collocated subblock is not available, the encoder/decoder may use the motion information of the collocated block specified by the temporal motion vector.

FIG. 19 is a diagram illustrating a method for configuring a merging candidate list according to a conventional image compression technology as an embodiment to which the present disclosure may be applied.

In the conventional image compression technology (e.g., HEVC), when the merge mode is applied, the encoder/decoder sequentially adds the candidate to the candidate list until it is satisfied that the total number of candidates is 5 by using spatial candidates, a temporal candidate, combined bi-prediction candidates, and a zero motion candidate in order to configure the candidate list.

In an embodiment, the encoder/decoder may add a predefined number of candidates for each candidate. The encoder/decoder considers respective candidates sequentially, but may terminate a merge candidate generation process when the maximum number is satisfied as illustrated in FIG. 19. As an example, the encoder/decoder may consider a maximum of four candidates as the spatial candidate. As an example, the encoder/decoder may consider a maximum of four candidates as the spatial candidate. Furthermore, the encoder/decoder may consider a maximum of five candidates as the combined bi-prediction candidate. Furthermore, the encoder/decoder may consider a maximum of five candidates as the zero motion candidate. In this case, as the spatial candidate, a maximum of four candidates may be considered according to the order of A1, B1, B0, A0, and B2 illustrated in FIG. 12 described above.

Embodiment 1

An embodiment of the present disclosure provides a method for generating a refined merge candidate by using a merge offset. As an embodiment, the encoder/decoder may generate the refined merge candidate by adding the motion vector offset to the merge candidate which is present in the merge candidate list.

In the present disclosure, the candidate (or merge candidate) in the candidate list (merge candidate list) may be referred to as a seed candidate. However, the present disclosure is not limited thereto. For example, the seed candidate may be referred to as a candidate added to the candidate list (merge candidate list), an added candidate, a candidate configured by the candidate list, a configured candidate, etc.

Furthermore, in an embodiment of the present disclosure, a predefined number of seed candidates may be used for generating the refined merge candidate. In the present disclosure, for convenience of description, the number of seed candidates used for generating the refined candidate may be expressed as n_seed. For example, in the case of n_seed=1, the encoder/decoder may select a first candidate of the merge candidate list or one candidate at a predefined position as the seed candidate for generating the refined candidate. Alternatively, for example, when n_seed=1 and the predefined position is A0 of FIG. 12, the encoder/decoder may use a candidate block at position A0 as the seed candidate.

Further, for example, in the case of n_seed=n, the encoder/decoder may use n candidates as the seed candidate in an order (e.g., merge index order) in the merge candidate list. Alternatively, for example, in the case of n_seed=n, candidates at predefined n positions may be used as the seed candidate. Thereafter, the encoder/decoder determines the seed candidate and then adds the motion vector offset to each seed candidate to generate the refined candidate. Furthermore, in the present disclosure, the motion vector offset added to generate the refined merge candidate is not limited to a name thereof. For example, the motion vector offset may be referred to as a merge motion vector offset, a motion vector difference value, a motion vector difference value offset, a merge motion vector difference value, etc.

Furthermore, according to an embodiment of the present disclosure, the generated candidate (or merge candidate) may be referred to as the refined candidate (or refined merge candidate). However, the present disclosure is not limited thereto. For example, the refined candidate may be referred to as the merge candidate, a general merge candidate, a candidate (or merge candidate) to which the motion vector offset is added, a candidate (or merge candidate) to which the motion vector difference value is added, etc.

FIG. 20 is a flowchart illustrating a method for generating a refined merge candidate as an embodiment to which the present disclosure is applied.

Referring to FIG. 20, in describing an embodiment of the present disclosure, the decoder is mainly described for convenience of description, but the candidate list generating method of the present disclosure may also be equally applied in the encoder.

The decoder configures (or generates) a merge candidate list by using motion information of a spatial candidate block and a temporal candidate block adjacent to a current block (S2001). As an embodiment, the encoder/decoder may configure the merge candidate list by applying the method described in FIGS. 12 to 18 above.

The decoder selects a predefined particular number of merge candidates used refined candidate derivation in the merge candidate list configured in step S2001 above (S2002). In the present disclosure, for convenience of description, a case where the specific number is 2 is mainly described, but the present disclosure is not limited thereto and one or three or more predefined number of candidates may be selected. As an example, the decoder may select a first merge candidate and a second merge candidate in the merge candidate list. In other words, the decoder may select two merge candidates in an order in which a merge index is allocated in the merge candidate list. The particular number may be predefined in the encoder and the decoder, and signaled from the encoder to the decoder. If the particular number is signaled, the particular number may be signaled through a Sequence Parameter Set, a Picture Parameter Set, a Slice Header (or Tile Group Header), etc.

The decoder determines (or selects) the merge candidate applied to the inter prediction of the current block among a predefined particular number of merge candidates (S2003). As an embodiment, the decoder may parse a first syntax element indicating a merge candidate applied to inter-prediction of the current block among a predefined specific number of candidates. That is, the decoder may determine a candidate for deriving the refined merge candidate of the first merge candidate or the second merge candidate based on the syntax element.

The decoder generates (or derives) the refined merge candidate by adding a motion vector offset to a motion vector of the merge candidate determined in step S2003 above (S2004). In this case, the motion vector offset may be signaled from the encoder, and the encoder and the decoder may derive the same value.

In an embodiment, the motion vector offset may have integer pixel precision and have fractional pixel precision. For example, precision of the motion vector offset (or basic unit) may have a value such as 1, ½, ¼, ⅛, or 1/16. Alternatively, for example, the precision of the motion vector offset may have the same precision as the motion vector of the merge candidate.

Further, in an embodiment, the precision of the motion vector offset may be defined (or signaled) through a higher level syntax. For example, the precision of the motion vector offset may be signaled from the encoder to the decoder through the Sequence Parameter Set, the Picture Parameter Set, the Slice Header (or Tile Group Header), etc.

The motion vector offset may have a value of an integer multiple of the basic unit and may be expressed as in Equation 3 below.

$$MV_{offset} = \{(v_x, v_y) \mid v_x - p * i, v_y - p * j\} \qquad \text{[Equation 3]}$$

In Equation 3, i and j are integers (natural numbers) other than 0. In addition, p represents the basic unit of a predefined motion vector offset.

The decoder generates the prediction block by using the motion information of the refined merge candidate (S2005).

In an embodiment, the refined candidate (or refined merge candidate) may be considered in an order close to the seed candidate in terms of a distance (or may be considered in an order in which an absolute value of the motion vector offset is smaller). As described above, the number of used refined candidates may be defined in the higher level syntax and in this case, the number of used refined candidates may be used in a range which does not exceed the maximum number of available merge candidates in the merge candidate list.

Further, in an embodiment, the decoder may add, to the merge candidate list, the motion information to which the motion vector offset is added. When the refined candidate is considered as the merge candidate, the decoder may add the refined candidate to the merge candidate list only when the refined candidate is not the same as the candidate which is already present in the merge candidate list by performing pruning check (or duplicate check). Alternatively, the decoder may add, to the merge candidate list, the refined candidate without the pruning check by considering decoding complexity.

Further, in an embodiment, the decoder may consider the refined candidate in a predefined particular order. In this case, a position for considering the refined candidate may be one or two or more positions. For example, a particular order (or position) for considering the aforementioned refined candidate may be 1) after sequentially confirming blocks (see FIG. 12) at positions A1, B1, B0, and A0 among the spatial candidates (or spatial neighboring blocks), 2) after confirming the spatial candidates, 3) after confirming the spatial candidate and the temporal candidate, 4) after confirming the spatial candidate, the temporal candidate, and a combined candidate, or 5) after confirming the spatial candidate, the temporal candidate, and the zero motion candidate.

Alternatively, for example, when the number of positions for considering the refined candidate is 2 or more, the decoder may consider n refined candidates after confirming blocks A1, B1, B0, and A0 of the spatial candidate and additionally consider p refined candidates after confirming the temporal candidate. In this case, the decoder may consider the same candidate as the seed candidate at each position and consider different seed candidates at respective positions.

Further, in an embodiment, prior to generating the refined candidate, if the merge candidate list may not be configured, the decoder may not configure the refined candidate. Alternatively, the decoder may determine the zero motion vector as the seed candidate and generate the refined candidate.

FIG. 21 is a diagram illustrating a motion vector offset used to generate a refined merge candidate as an embodiment to which the present disclosure is applied.

In FIG. 21, a case where the motion vector offset is determined in units of ½ pixel is assumed. However, the present disclosure is not limited thereto and as described above, the precision (or basic unit) of the motion vector offset may have a value such as 1, ½, ¼, ⅛, or 1/16. In addition, in FIG. 21, a case where the maximum number of available offsets (or refined candidates) is 8 is assumed. However, the present disclosure is not limited thereto and multiple pixels (integer pixels or subpixels) adjacent to a pixel specified by the merge candidate in the merge candidate list may be considered as the refined candidate.

Referring to FIG. 21, a dotted line is a grid of ½ pixel unit and a point at a center position is a first seed candidate (or a position indicating the motion vector of the first seed candidate). As an embodiment, four refined candidates closest to a seed candidate marked by X may be preferentially considered. Four refined candidates marked with a second close square may be considered. In an example, the number of refined candidates which does not exceed the maximum number of merge candidates among a total of 8 candidates may be considered as the merge candidate. Alternatively, a pixel (integer pixel or subpixel) adjacent to the seed candidate (or a position indicating the motion vector of the seed candidate) or the motion vector offset indicating the corresponding position may be transmitted from the encoder to the decoder.

Embodiment 2

An embodiment of the present disclosure provides a method for generating the refined merge candidate by using weighted averaging. As an embodiment, the encoder/decoder may generate (or derive) the refined merge candidate by performing weighted averaging for a particular number of merge candidates in the merge candidate list.

In an embodiment of the present disclosure, a predefined number of seed candidates may be used for generating the refined merge candidate. In the present disclosure, for convenience of description, a case where the specific number is 2 is mainly described, but the present disclosure is not limited thereto and one or three or more predefined number of candidates may be selected. For example, the encoder/decoder may use, as the seed candidate, n candidates in the order within the merge candidate list.

In the present disclosure, the candidate (or merge candidate) in the candidate list (merge candidate list) may be referred to as the seed candidate. However, the present disclosure is not limited thereto. For example, the seed candidate may be referred to as a candidate added to the candidate list (merge candidate list), an added candidate, a candidate configured by the candidate list, a configured candidate, etc.

Furthermore, according to an embodiment of the present disclosure, the generated candidate (or merge candidate) may be referred to as the refined candidate (or refined merge candidate). However, the present disclosure is not limited thereto. For example, the refined candidate may be referred to as the merge candidate, a general merge candidate, a candidate (or merge candidate) to which the motion vector offset is added, a candidate (or merge candidate) to which the motion vector difference value is added, etc.

As an example, the refined merge candidate may be derived by using Equation 4 below.

$$Cand_{refined} = (1 - w) * seed\_1st + w * seed\_2nd \qquad \text{[Equation 4]}$$

In Equation 4, seed_1st and seed_2nd represent a first seed candidate and a second seed candidate, respectively. In addition, a value of w may be one of values expressed by Equation 5 below.

$$w = \left\{ \frac{1}{16}, \frac{2}{16}, \frac{3}{16}, \frac{4}{16}, \frac{5}{16}, \frac{6}{16}, \frac{7}{16}, \frac{8}{16} \right\} \qquad \text{[Equation 5]}$$

$$w = \left\{ \frac{1}{8}, \frac{2}{8}, \frac{3}{8}, \frac{4}{8} \right\}$$

$$w = \left\{ \frac{1}{4}, \frac{2}{4} \right\}$$

$$w = \left\{ \frac{1}{2} \right\}$$

That is, the decoder may generate the refined merge candidate by weighted averaging predefined two candidate pairs in the merge candidate list. For example, the predefined pair may be {(0,1), (0,2), (1,2), (0,3) (1, 3), (2, 3)}. Here, the number represents the merge index (or merge candidate order) within the merge candidate list. In an embodiment, the weighted averaged motion vector may be individually calculated for respective reference picture lists (or reference lists). When two motion vectors are usable in one reference picture list, the respective motion vectors may be weighted averaged even when the respective motion vectors indicate different reference pictures.

The method proposed in the embodiment may be just applied to the embodiment described in FIGS. 12 to 19 above and/or Embodiment 1 described above. By taking the case where the method proposed in the embodiment is applied to Embodiment 1 described above as an example, the encoder/decoder may add a weighted averaging candidate proposed in the embodiment to the merge candidate list after configuring the merge candidate list by using the motion information of the spatial candidate block and the temporal candidate block. In addition, the encoder/decoder may derive the refined merge motion vector by adding the motion vector offset to the merge candidate in the merge candidate list.

Further, in an embodiment, the encoder/decoder may consider, as the seed candidate, only the merge candidate including the same reference picture. Alternatively, the encoder/decoder may add, to the merge candidate list, a motion vector scaled with a particular reference frame (e.g., collocated picture) and weighted averaged as the refined merge candidate. For example, the particular reference frame may use each reference frame or use a reference frame which occurs most often in a surrounding block.

Embodiment 3

An embodiment of the present disclosure provides a method for generating the refined merge candidate by using averaging. As an embodiment, the encoder/decoder may generate (or derive) the refined merge candidate by performing averaging for a particular number of merge candidates in the merge candidate list.

In an embodiment of the present disclosure, a predefined number of seed candidates may be used for generating the refined merge candidate. In the present disclosure, for convenience of description, a case where the specific number is 2 is mainly described, but the present disclosure is not limited thereto and one or three or more predefined number of candidates may be selected. For example, the encoder/decoder may use, as the seed candidate, n candidates in the order within the merge candidate list. Alternatively, the selected seed candidate may be a combination which may be determined in the merge candidate list which is already determined. For example, when the number of candidates in the already determined merge candidate list is 3, the number of combinations of two seed candidates may be 3 and three refined candidates (or refined merge candidates) may be derived based thereon.

Alternatively, in an embodiment, the number of seed candidates may be n, and the n value may be determined by the number of candidates which may be considered as the seed candidate (i.e., the number of merge candidates of the already configured merge candidate list). For example, when the number of candidates usable as the seed candidate is 3, both the case of n=2 and the case of n=3 may be considered.

In the present disclosure, the candidate (or merge candidate) in the candidate list (merge candidate list) may be referred to as the seed candidate. However, the present disclosure is not limited thereto. For example, the seed candidate may be referred to as a candidate added to the candidate list (merge candidate list), an added candidate, a candidate configured by the candidate list, a configured candidate, etc.

Furthermore, according to an embodiment of the present disclosure, the generated candidate (or merge candidate) may be referred to as the refined candidate (or refined merge candidate). However, the present disclosure is not limited thereto. For example, the refined candidate may be referred to as the merge candidate, a general merge candidate, a candidate (or merge candidate) to which the motion vector offset is added, a candidate (or merge candidate) to which the motion vector difference value is added, etc.

As an example, the refined merge candidate may be derived by using Equation 6 below.

$$Cand_{refined} = \frac{1}{2} * seed_{1st} + \frac{1}{2} * seed\_2nd \qquad \text{[Equation 6]}$$

In Equation 6, seed_1st and seed_2nd may represent the first seed candidate and the second seed candidate, respectively and the seed_1st and the seed_2nd may be selected as a particular combination among the candidates in the already determined merge candidate list.

That is, the decoder may generate the refined merge candidate by averaging predefined two candidate pairs in the merge candidate list. For example, the predefined pair may be {(0,1), (0,2), (1,2), (0,3) (1, 3), (2, 3)}. Here, the number represents the merge index (or merge candidate order) within the merge candidate list. In an embodiment, the averaged motion vector may be individually calculated for respective reference picture lists (or reference lists). When two motion vectors are usable in one reference picture list, the respective motion vectors may be averaged even when the respective motion vectors indicate different reference pictures.

The method proposed in the embodiment may be just applied to the embodiment described in FIGS. 12 to 19 above and/or Embodiment 1 described above. By taking the case where the method proposed in the embodiment is applied to Embodiment 1 described above as an example, the encoder/decoder may add an averaging candidate proposed in the embodiment to the merge candidate list after configuring the merge candidate list by using the motion information of the spatial candidate block and the temporal candidate block. In addition, the encoder/decoder may derive the refined merge motion vector by adding the motion vector offset to the merge candidate in the merge candidate list.

Further, in an embodiment, the encoder/decoder may consider, as the seed candidate, only the merge candidate including the same reference picture. Alternatively, the encoder/decoder may add, to the merge candidate list, a motion vector scaled with a particular reference frame (e.g., collocated picture) and averaged as the refined merge candidate. For example, the particular reference frame may use each reference frame or use a reference frame which occurs most often in a surrounding block.

As described above, the embodiments of the present disclosure descried above have been described separately for the convenience of description, but the present disclosure is not limited thereto. That is, the embodiments described in Embodiments 1 to 3 described above may be performed independently and one or more various embodiments may be combined and performed.

FIG. 22 is a flowchart illustrating a method for generating an inter prediction block according to an embodiment to which the present disclosure is applied.

Referring to FIG. 22, the decoder is primarily described for convenience of description, but the present disclosure is not limited thereto and the method for generating the inter-prediction block according to an embodiment of the present disclosure may be performed similarly in the encoder and the decoder.

The decoder configures a merge candidate list by using motion information of a spatial candidate and a temporal candidate adjacent to a current block (S2201).

As described in Embodiment 2 above, the decoder may add, to the merge candidate list, a candidate generated by weighted averaging a predefined candidate pair in the merge candidate list which is previously determined.

Furthermore, as described in Embodiment 3 above, the decoder may add, to the merge candidate list, the candidate generated by averaging the predefined candidate pair in the merge candidate list which is previously determined.

The decoder parses a first syntax element indicating a particular candidate applied to inter-prediction of the current block among a predefined number of candidates in the merge candidate list (S2202).

As described in Embodiment 1 above, the decoder may parse the first syntax element indicating the particular candidate applied to the inter-prediction of the current block between the first candidate and the second candidate in the order in which the merge index is allocated in the merge candidate list.

The decoder derives a refined candidate by adding a motion vector offset to a motion vector of a candidate indicated by the first syntax element (S2203).

As described in Embodiment 1 above, the motion vector offset may be derived based on the motion vector offset precision indicating whether the motion vector offset has the integer pixel precision or the fractional pixel precision.

Furthermore, as described in Embodiment 1 above, the decoder may parse a second syntax element indicating the motion vector offset precision, and in this case, the second syntax element may be transmitted through the Sequence Parameter Set, the Picture Parameter Set, or the Slice Header.

Furthermore, as described in Embodiment 1 above, the motion vector offset may be derived based on a value acquired by multiplying the motion vector offset precision by a non-zero integer.

The decoder generates the prediction block of the current block by using the motion information of the current block (S2204).

FIG. 23 is a diagram illustrating an inter prediction device according to an embodiment to which the present disclosure is applied.

In FIG. 23, the inter-prediction unit is illustrated as one block for convenience of description, but the inter-prediction unit may be implemented in a component included in the encoder and/or the decoder.

Referring to FIG. 23, the inter prediction unit implements the functions, procedures, and/or methods proposed in FIGS. 8 to 22 above. Specifically, the inter-prediction unit may be configured to include a merge candidate list configuring unit 2301, a first syntax element parsing unit 2302, a refined candidate derivation unit 2303, and a prediction block generation unit 2304.

The merge candidate list configuring unit configures a merge candidate list by using motion information of a spatial candidate and a temporal candidate adjacent to a current block.

As described in Embodiment 2 above, the merge candidate list configuring unit 2301 may add, to the merge candidate list, a candidate generated by weighted averaging a predefined candidate pair in the merge candidate list which is previously determined.

Furthermore, as described in Embodiment 3 above, the merge candidate list configuring unit 2301 may add, to the merge candidate list, a candidate generated by averaging a predefined candidate pair in the merge candidate list which is previously determined.

The first syntax element parsing unit 2302 parses a first syntax element indicating a particular candidate applied to inter-prediction of the current block among a predefined number of candidates in the merge candidate list.

As described in Embodiment 1 above, the first syntax element parsing unit 2302 may parse the first syntax element indicating the particular candidate applied to the inter-prediction of the current block between a first candidate and a second candidate in an order in which a merge index is allocated in the merge candidate list.

The refined candidate derivation unit 2303 derives a refined candidate by adding a motion vector offset to a motion vector of a candidate indicated by the first syntax element.

As described in Embodiment 1 above, the motion vector offset may be derived based on the motion vector offset precision indicating whether the motion vector offset has the integer pixel precision or the fractional pixel precision.

Furthermore, as described in Embodiment 1 above, the refined candidate derivation unit 2303 may parse a second syntax element indicating the motion vector offset precision, and in this case, the second syntax element may be transmitted through the Sequence Parameter Set, the Picture Parameter Set, or the Slice Header.

Furthermore, as described in Embodiment 1 above, the motion vector offset may be derived based on a value acquired by multiplying the motion vector offset precision by a non-zero integer.

The prediction block generation unit 2304 generates the prediction block of the current block by using the motion information of the current block.

FIG. 24 illustrates a video coding system to which the present disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

FIG. 25 is a configuration diagram of a content streaming system as an embodiment to which the present disclosure is applied.

Referring to FIG. 25, the content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the present disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VOD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A decoding apparatus for image decoding, the decoding apparatus comprising:
   a memory; and
   at least one processor connected to the memory, the at least one processor configured to:
   obtain residual information of a current block from a bitstream;
   determine an inter prediction mode of the current block as a merge mode among the merge mode and a Motion Vector Prediction (MVP) mode;
   configure a merge candidate list based on motion information of a spatial candidate and a temporal candidate for the current block in the merge mode;
   obtain merge motion vector offset precision information related to whether a merge motion vector offset has a fractional pixel precision, wherein the merge motion vector offset precision information is obtained from a picture parameter set;
   determine a merge candidate used to derive a refined merge candidate based on the merge motion vector offset, wherein a merge candidate on 0th position of the merge candidate list is determined as the merge candidate used to derive a refined merge candidate based on the merge motion vector offset;
   derive motion information of the refined merge candidate based on a sum of the merge motion vector offset, which is derived based on the merge motion vector offset precision information, and a motion vector of the determined merge candidate; and
   derive a prediction block of the current block based on the motion information of the refined merge candidate; and
   derive a residual block of the current block based on the residual information; and
   generate a reconstructed block of the current block based on the prediction block and the residual block,
   wherein a merge candidate generated based on an average of a pair of predefined candidates is added in the merge candidate list after configuring the merge candidate list including the spatial candidate and the temporal candidate,
   wherein the pair of predefined candidates is a pair of a candidate on the 0th position and a candidate on 1st position of the merge candidate list, and
   wherein the merge motion vector offset is derived based on a value acquired by multiplying a merge motion vector offset precision by a non-zero integer.

2. An encoding apparatus for image encoding, the encoding apparatus comprising:
   a memory; and
   at least one processor connected to the memory, the at least one processor configured to:
   determine an inter prediction mode of a current block as a merge mode among the merge mode and a Motion Vector Prediction (MVP) mode;

configure a merge candidate list based on motion information of a spatial candidate and a temporal candidate for the current block in the merge mode;
   determine a merge candidate used to derive a refined merge candidate based on a merge motion vector offset, wherein a merge candidate on 0th position of the merge candidate list is determined as the merge candidate used to derive a refined merge candidate based on the merge motion vector offset;
   derive motion information of the refined merge candidate based on a sum of the merge motion vector offset, which is derived based on merge motion vector offset precision information, and a motion vector of the determined merge candidate;
   derive a prediction block of the current block based on the motion information of the refined merge candidate;
   derive a residual block of the current block based on the prediction block of the current block; and
   generate video information including the merge motion vector offset precision information related to whether the merge motion vector offset has a fractional pixel precision and residual information for the residual block, wherein the merge motion vector offset precision information is included in a picture parameter set of the video information,
   wherein a merge candidate generated based on an average of a pair of predefined candidates is added in the merge candidate list after configuring the merge candidate list including the spatial candidate and the temporal candidate,
   wherein the pair of predefined candidates is a pair of a candidate on the 0th position and a candidate on 1st position of the merge candidate list, and
   wherein the merge motion vector offset is derived based on a value acquired by multiplying a merge motion vector offset precision by a non-zero integer.

3. An apparatus for transmitting data for an image, the apparatus comprising:
   at least one processor configured to obtain a bitstream of video information including merge motion vector offset precision information related to whether a merge motion vector offset has a fractional pixel precision and residual information for a residual block of the current block, wherein the merge motion vector offset precision information is included in a picture parameter set of the video information; and
   a transmitter configured to transmit the data including the bitstream of the video information including the merge motion vector offset precision information and the residual information,
   wherein a prediction block of the current block is derived by determining an inter prediction mode of the current block as a merge mode among the merge mode and a Motion Vector Prediction (MVP) mode, configuring a merge candidate list based on motion information of a spatial candidate and a temporal candidate for the current block in the merge mode, determining a merge candidate used to derive a refined merge candidate based on the merge motion vector offset, wherein a merge candidate on 0th position of the merge candidate list is determined as the merge candidate used to derive a refined merge candidate based on the merge motion vector offset, deriving motion information of the refined merge candidate based on a sum of the merge motion vector offset, which is derived based on the merge motion vector offset precision information, and a motion vector of the determined merge candidate, wherein a merge candidate generated based on an average of a pair of predefined candidates is added in the merge candidate list after configuring the merge candidate list including the spatial candidate and the temporal candidate, wherein the pair of predefined candidates is a pair of a candidate on the 0th position and a candidate on 1st position of the merge candidate list, and wherein the merge motion vector offset is derived based on a value acquired by multiplying a merge motion vector offset precision by a non-zero integer.

\* \* \* \* \*